US010498581B2

United States Patent
Achuthan et al.

(10) Patent No.: US 10,498,581 B2
(45) Date of Patent: Dec. 3, 2019

(54) EVENT PROCESSING IN A NETWORK MANAGEMENT SYSTEM

(71) Applicant: Telefonaktiebolaget LM Ericsson (publ), Stockholm (SE)

(72) Inventors: Sajeevan Achuthan, Athlone (IE); Liam Fallon, Athlone (IE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 137 days.

(21) Appl. No.: 15/303,705

(22) PCT Filed: Apr. 16, 2014

(86) PCT No.: PCT/EP2014/057728
§ 371 (c)(1),
(2) Date: Oct. 12, 2016

(87) PCT Pub. No.: WO2015/158377
PCT Pub. Date: Oct. 22, 2015

(65) Prior Publication Data
US 2017/0041181 A1    Feb. 9, 2017

(51) Int. Cl.
*H04L 12/24* (2006.01)
*G06F 9/54* (2006.01)

(52) U.S. Cl.
CPC .......... *H04L 41/0213* (2013.01); *G06F 9/542* (2013.01); *H04L 41/06* (2013.01)

(58) Field of Classification Search
CPC ...... H04L 41/0213; H04L 41/06; G06F 9/542
See application file for complete search history.

(56) References Cited

U.S. PATENT DOCUMENTS 6,681,251 B1 *  1/2004  Leymann ............ H04L 67/1008
                                                709/203
8,391,296 B2    3/2013  Sailhan et al.
(Continued)

FOREIGN PATENT DOCUMENTS

| EP | 2160867 B1 | 8/2011 |
| WO | 2004107216 A2 | 12/2004 |
| WO | 2015058796 A1 | 4/2015 |

OTHER PUBLICATIONS

3GPP, "3rd Generation Partnership Project; Technical Specification Group Services and System Aspects; Intra-domain connection of Radio Access Network (RAN) nodes to multiple Core Network (CN) nodes (Release 12)", 3GPP TS 23.236 V12.0.0, Jun. 2013, 1-40.

(Continued)

*Primary Examiner* — John M MacIlwinen
(74) *Attorney, Agent, or Firm* — Patent Portfolio Builders, PLLC

(57) ABSTRACT

A network management system (10) of a communication network (5) determines members of a pool (20, 30, 40) of consumers (21, 31, 41) in the network management system (10). Consumers are arranged to receive network management event data from network elements (5, 6, 7) of the communication network (5). The network management system (10) determines members of a pool (50, 60, 70) of instances (51, 61, 71) of a network management application (A, B, N) in the network management system (10). Instances of the network management application are arranged to process the network management event data. The network management system (10) determines a mapping between the pool (20) of consumers (21) and the pool (50) of instances (51) of the network management application (A). The mapping defines connections (15) for forwarding network management event data. Each of the connections is defined (Continued)

between a member (21) of the pool (20) of consumers and a member (51) of the pool (50) of instances of the network management application.

18 Claims, 21 Drawing Sheets

(56) References Cited

U.S. PATENT DOCUMENTS

| | | | |
|---|---|---|---|
| 2005/0229183 A1 | 10/2005 | Araujo et al. | |
| 2007/0226182 A1* | 9/2007 | Sobotka | G06F 16/9535 |
| 2011/0122773 A1* | 5/2011 | Kung | H04L 41/0631 |
| | | | 370/241 |
| 2013/0138753 A1 | 5/2013 | Murthy et al. | |
| 2013/0191185 A1 | 7/2013 | Galvin | |

OTHER PUBLICATIONS

Coulouris, George et al., "Distributed Systems Concepts and Design", Pearson Education, Inc. 5th edition, 2012, 1-17.
Etzion, Opher et al., "Event Processing in Action", Manning Publications Co., 2011, 1-42.
Eugster, Patrick et al., "The Many Faces of Publish/Subscribe", ACM Computing Surveys, vol. 35, No. 2, Jun. 2003, 114-131.
Gust AS, Per et al., "Real-time performance monitoring and optimization of cellular systems", Ericsson Review No. 1, 2002, 4-13.
Harrington, D. et al., "An Architecture for Describing Simple Network Management Protocol (SNMP) Management Frameworks", Network Working Group, Dec. 2002, 1-57.
Suconic, Clebert et al., "HornetQ User Manual", Red Hat Inc., 2011, 1-37.
Unknown, Author, "Apache ActiveMQ 5.11.1", The Apache Software Foundation, 2011, 1-4.
Unknown, Author, "Apache Kafka—A high-throughput distributed messaging system", Kafka 0.8.2 Documentation, 1-35.
Unknown, Author, "Databus Load Balancing Client", GitHub, Sep. 30, 2013, 1-4.
Unknown, Author, "Esper Reference", Esper Team and EsperTech Inc., Version 5.2.0, 2015, 1-812.
Unknown, Author, "RabbitMQ", Pivotal Software, Inc., 2015, 1-1.
Vargas, Luis et al., "Event-Driven Database Information Sharing", Sharing Data, Information and Knowledge, Lecture Notes in Computer Science, vol. 5071, Jul. 7-10, 2008, 113-125.
Office Action issued in application No. 14725373.6 dated Sep. 12, 2018; 7 pages.

* cited by examiner

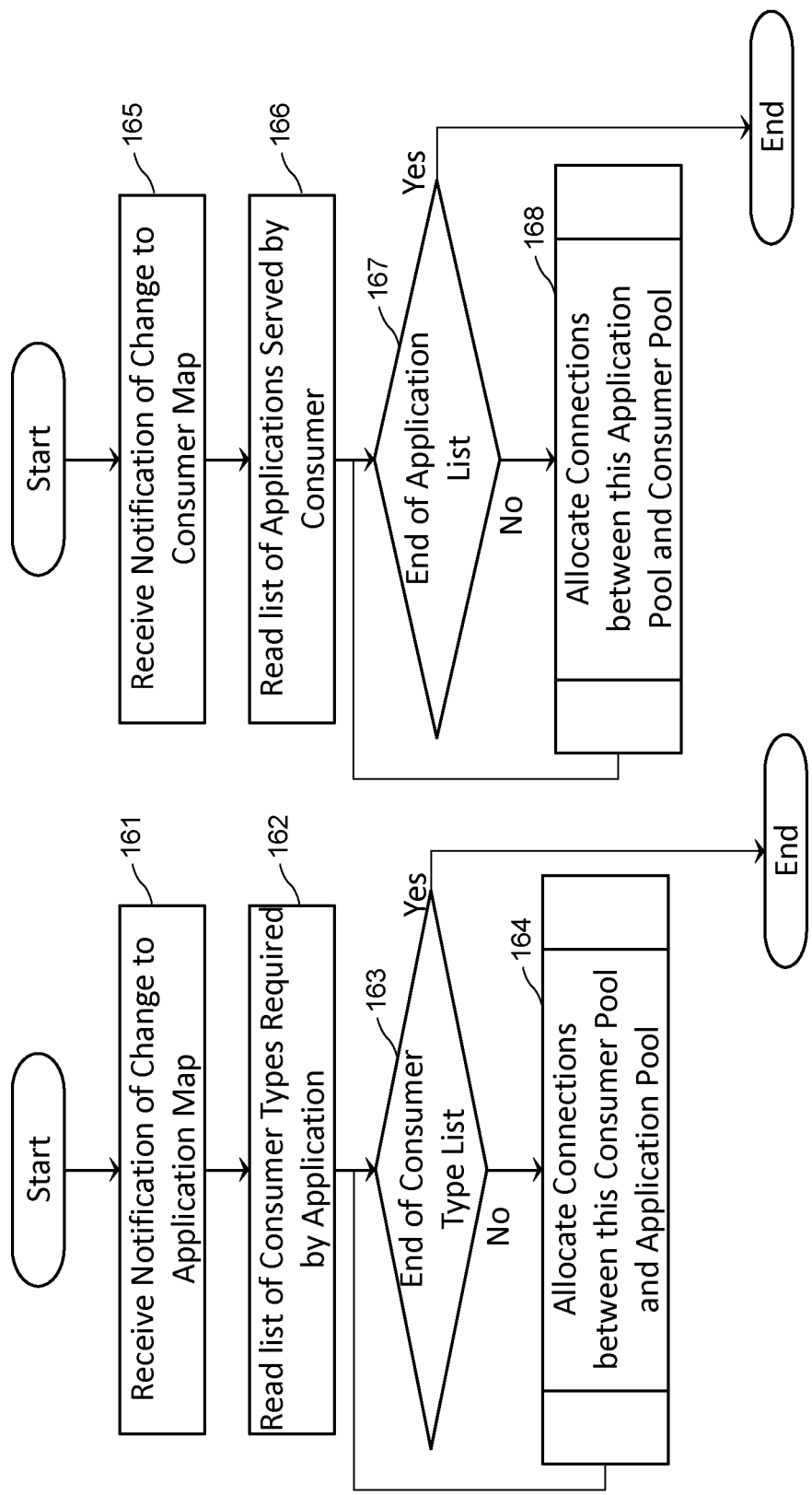

EVENT PROCESSING IN A NETWORK MANAGEMENT SYSTEM

TECHNICAL FIELD

This invention relates to processing event data in a network management system of a telecommunication network.

BACKGROUND

Network management systems are increasingly using events to monitor the state of telecommunication services and networks. Telecommunication events can be of many types and can come from many sources. Typical types are alarms, performance counters, session events, or CDRs. Such events may come from disparate nodes such as base stations, gateways, or routers, and may use different transport mechanisms such as Third Generation Partnership Project (3GPP) Integration Reference Points (IRP), Simple Network Management Protocol (SNMP), or Network Configuration Protocol (NETCONF). Events are an important source of information for network management systems. In recent years, the number of events generated by networks from these traditional sources has greatly increased and event-based mechanisms are now used to provide information on network and service state and sessions, traditionally the domain of performance counters.

FIG. 1 shows an example telecommunication management system 10 receiving events. An Event Consumption Component (ECC) can consume event streams from each incoming source and applications can use events of certain types in order to provide some functionality. Applications A to N use events from the network 5. The ECC receives events from the network elements in the network 5 and forwards them to the applications.

In general, the set of events required by a particular application such as Application B is a subset of the total set of events available in the ECC. An ECC can maintain a Forwarding List of the events that should be forwarded to each application and only forward those events to each particular application. This Forwarding List may be configured on the ECC or may be built up dynamically if the ECC provides a subscription interface for applications.

In order to scale a system such as that shown in FIG. 1 it is necessary to allow multiple ECC instances and multiple instances of each application to be deployed. Instances may be spread over a number of physical computers. FIG. 2 shows an example of a system with multiple ECC instances and multiple instances of each application. Each ECC instance handles sessions towards a particular set of network elements, which is a subset of the full set of network elements in the managed network 5. Each application instance carries a subset of the total workload of its application. This system is fully-meshed, i.e. each ECC is connected to each application instance. A fully-meshed forwarding scheme between ECC instances and application instances, as in FIG. 2, does not scale beyond very small pool sizes and is impractical for a large network management system. As the number of ECC instances and application instances increase, the event load between adapters and applications increases exponentially because of the massive duplication of events. In systems with even tens of ECC instances and application instances, the event load manifestly becomes unacceptable.

Existing network management systems suffer from one or more possible drawbacks. For example, they may be difficult to scale, or they may only permit scaling on the consumer (ECC) side of the system or on the application side of the system. The manner in which consumers forward to an application, or instances of an application, can require forwarding schemes which are difficult to configure.

SUMMARY

An aspect of the invention provides a method of operating a network management system of a communication network. The method comprises determining members of a pool of consumers in the network management system. The consumers are arranged to receive network management event data from network elements of the communication network. The method comprises determining members of a pool of instances of a network management application in the network management system. The instances of the network management application are arranged to process the network management event data. The method comprises determining a mapping between the pool of consumers and the pool of instances of the network management application. The mapping defines connections for forwarding network management event data. Each of the connections is defined between a member of the pool of consumers and a member of the pool of instances of the network management application.

The mapping may be constrained such that any member of the pool of consumers is connected to a single member of the pool of instances of the network management application.

The mapping may be constrained such that all network management event data from a particular network element is forwarded to a single member of the pool of instances of the network management application.

The mapping may permit any member of the pool of instances of the network management application to be connected to more than one member of the pool of network management event consumers.

The step of determining members of the pool of consumers in the network management system may comprise receiving an indication from the consumer that said consumer is a member of the pool of consumers.

The step of determining members of the pool of instances of the network management application may comprise receiving an indication from the instance that said instance is a member of the pool of instances of the network management application.

The step of determining members of the pool of consumers in the network management system may comprise determining event types the consumers receive from network nodes.

The step of determining members of the pool of instances of the network management application in the network management system may comprise determining event types the instances of the network management application want to receive from consumers.

The method may further comprise determining a change in the network management system comprising at least one of: addition of a new member to the pool of consumers; removal of an existing member of the pool of consumers.

The method may further comprise determining a change in the network management system comprising at least one of: addition of a new member to the pool of instances of the network management application; removal of an existing member of the pool of instances of the network management application.

The step of determining a mapping between the pool of consumers and the pool of instances of the network management application may be updated or repeated if a change is determined.

The mapping may be performed on a round robin basis.

The round robin mapping may comprise a step (i) of selecting a member of the pool of network management consumers. The mapping may further comprise a step (ii) of selecting a member of the pool of instances of the network management application. The mapping may further comprise a step (iii) of mapping the member selected at (i) to the member selected at step (ii). The mapping may further comprise a step (iv) of selecting the next member of the pool of network management consumers and repeating steps (ii) and (iii). The mapping may further comprise a step (v) of repeating (iv) until all members of the pool of network management consumers have been selected, wherein the members selected at step (ii) are selected on a round robin basis from the pool of instances of the network management application.

The mapping may be based on load. The load may be traffic load of the individual connections between the members of the pool of network management event consumers and the members of the pool of instances of the network management application. Additionally, or alternatively, the load may be processing load of the members of the pool of instances of the network management application.

The mapping may evenly distribute load between members of the pool of instances of the network management application.

There may be a plurality of network management applications, each network management application comprising a pool of instances of the network management application.

The mapping may be constrained such that any member of the pool of consumers is connected to a single member in each of the respective pools of instances of the network management applications.

There may be a plurality of pools of consumers. The pools may be arranged according to consumer type, each consumer receiving events from a subset of the network elements.

The mapping may permit at least one of: one or more consumers in pools of the same consumer type to be connected to a same instance of an application; one or more consumers in pools of different consumer type to be connected to a same instance of an application.

Different members of a pool of the same consumer type event may be arranged to receive events from different network elements of the communication network.

The method may be performed by a controller of the network management system. The controller may be a central controller of the network management system, or the controller may be one of a plurality of controllers in the network management system.

Another aspect of the invention provides a controller for a network management system. The network management system comprising a pool of network management event consumers and a pool of instances of a network management application. The controller comprises a processor and a memory. The memory contains instructions executable by the processor whereby the controller is operative to determine members of a pool of consumers in the network management system. The consumers are arranged to receive network management event data from network elements of the communication network. The controller is operative to determine members of a pool of instances of a network management application in the network management system. The instances of the network management application are arranged to process the network management event data. The controller is operative to determine a mapping between the pool of consumers and the pool of instances of the network management application. The mapping defines connections for forwarding network management event data, each of the connections being defined between a member of the pool of consumers and a member of the pool of instances of the network management application.

Another aspect of the invention provides apparatus for a network management system comprising a pool of network management event consumers and a pool of instances of a network management application. The apparatus is adapted to determine members of a pool of consumers in the network management system, wherein the consumers are arranged to receive network management event data from network elements of the communication network. The apparatus is adapted to determine members of a pool of instances of a network management application in the network management system, wherein the instances of the network management application are arranged to process the network management event data. The apparatus is adapted to determine a mapping between the pool of consumers and the pool of instances of the network management application, the mapping defining connections for forwarding network management event data, each of the connections being defined between a member of the pool of consumers and a member of the pool of instances of the network management application.

The apparatus may be adapted to perform any of the described or claimed features of the method.

Another aspect of the invention provides apparatus for a network management system comprising a pool of network management event consumers and a pool of instances of a network management application. The apparatus comprises a first module configured to determine members of a pool of consumers in the network management system. The consumers are arranged to receive network management event data from network elements of the communication network. The apparatus comprises a second module configured to determine members of a pool of instances of a network management application in the network management system. The instances of the network management application are arranged to process the network management event data. The apparatus comprises a third module configured to determine a mapping between the pool of consumers and the pool of instances of the network management application. The mapping defines connections for forwarding network management event data, each of the connections being defined between a member of the pool of consumers and a member of the pool of instances of the network management application.

Another aspect of the invention provides a computer program product comprising a machine-readable medium carrying instructions which, when executed by a processor, cause the processor to perform any of the described or claimed steps of the method.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 11 shows a method of updating an application map;

FIG. 12 shows a method of updating a consumer map;

DETAILED DESCRIPTION

Figure 1:
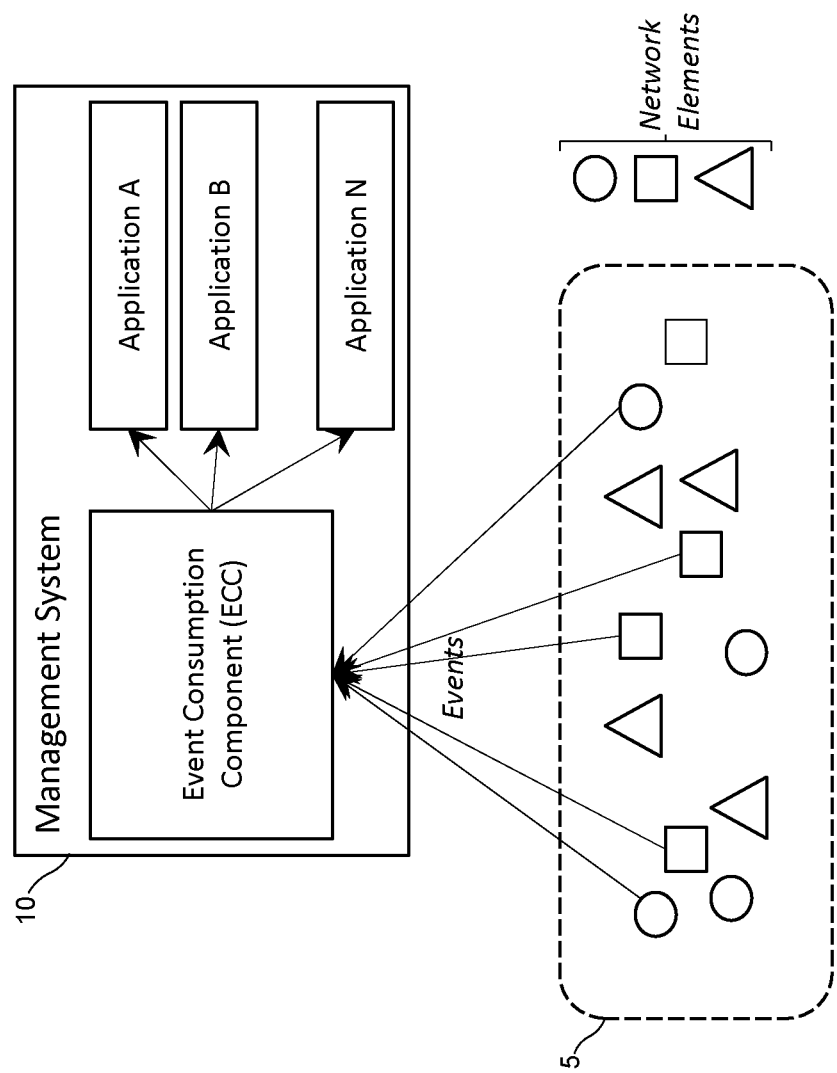
FIG. 1 shows a network management system with a consumer and applications.
Figure 2:
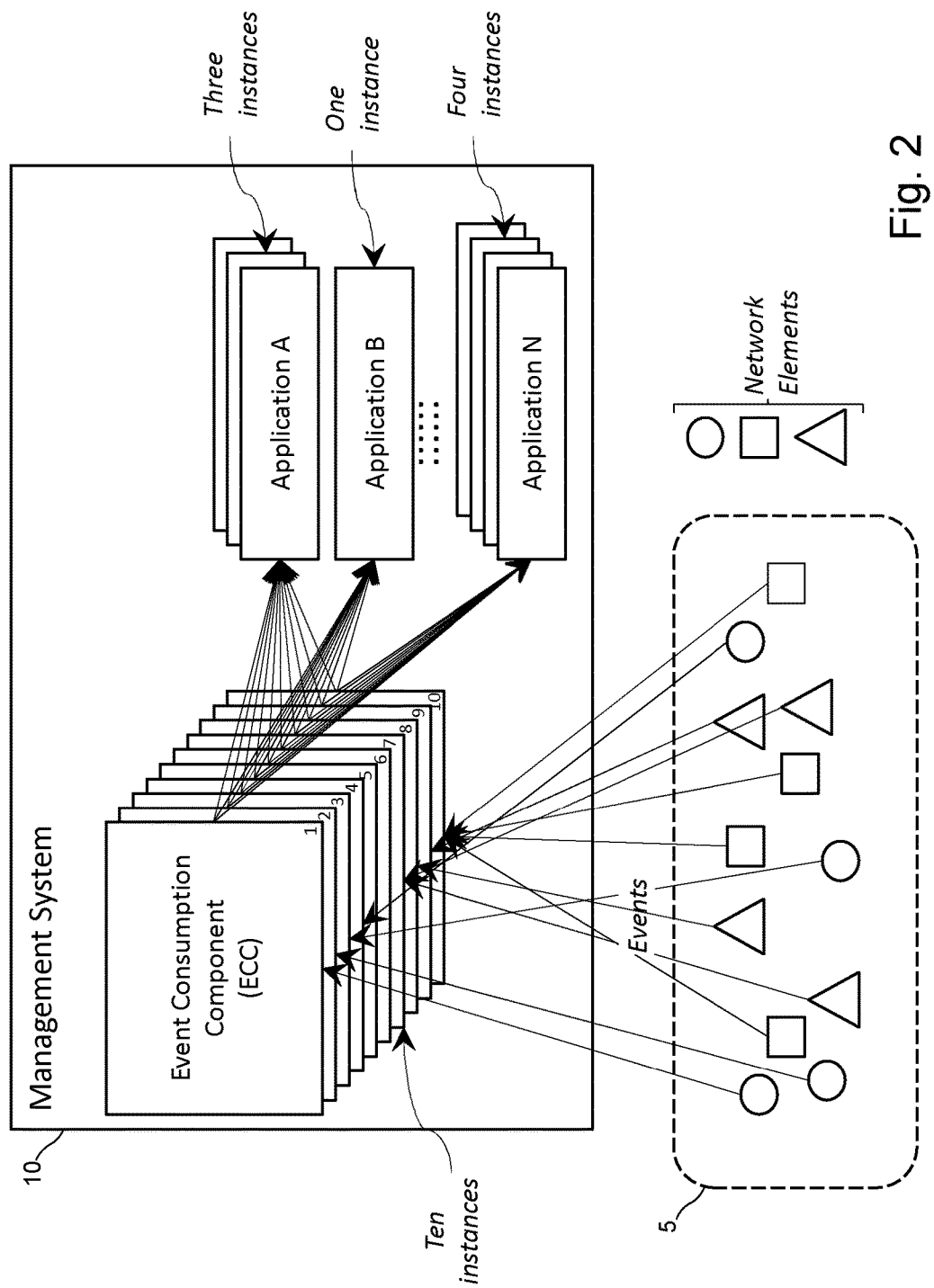
FIG. 2 shows a network management system with multiple consumers and multiple applications with a fully-meshed interconnection between consumers and applications.
Figure 3A:
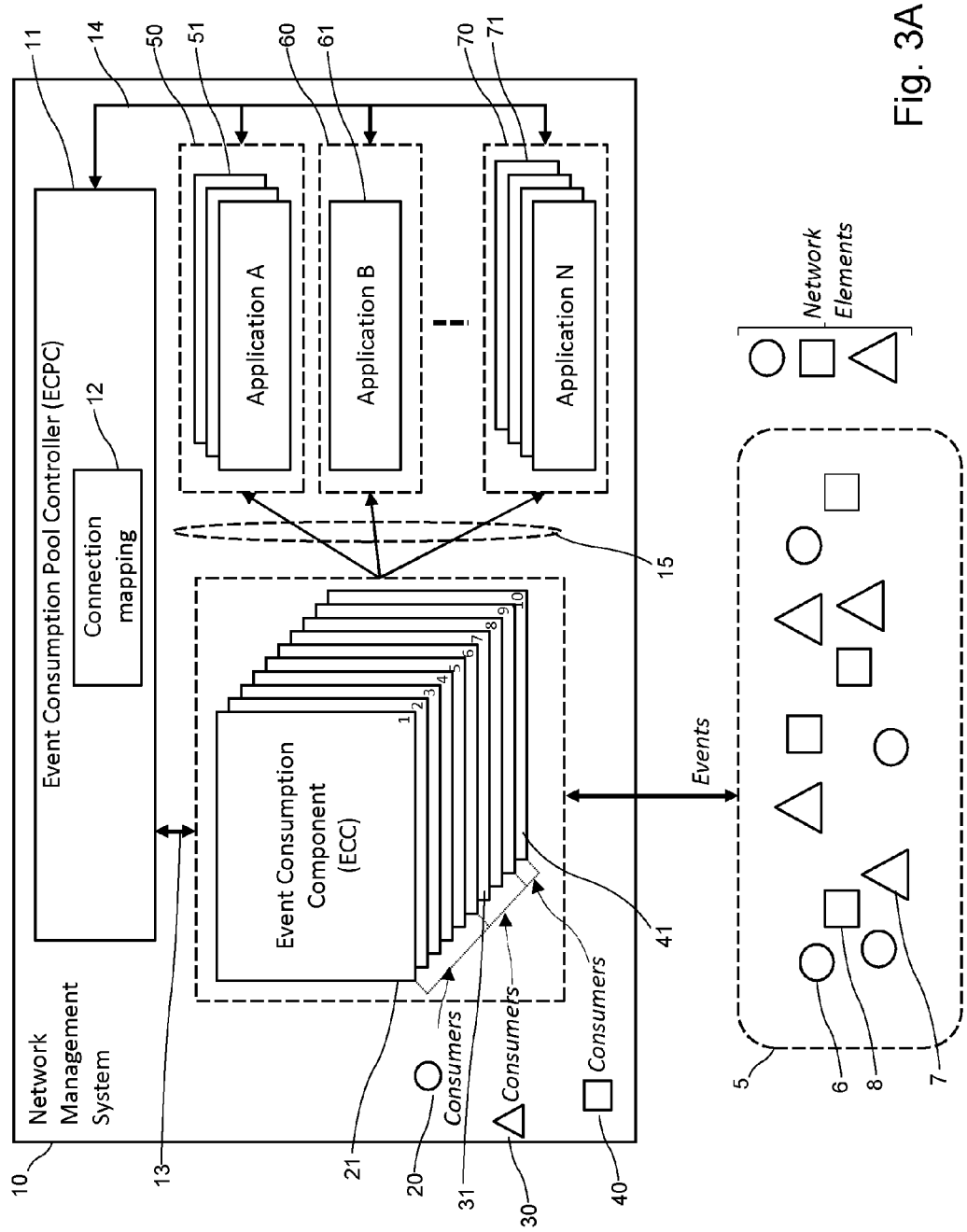
FIG. 3A shows a network management system according to an embodiment.

FIG. 3A schematically shows a communication network 5 and a network management system (NMS) 10 for the network 5. The network management system 10 generally comprises Event Consumption Components (ECC) 21, 31, 41 and applications A, B, . . . N. Event Consumption Components receive, or "consume", events which originate from network elements 6, 7, 8 in the communication network 5. The term "consumer" will be used interchangeably with Event Consumption Component (ECC). An application A, B, . . . N receives events from one or more consumers 21, 31, 41 and performs processing on those events. For example, an application may examine the events received from two network elements to ensure that handoffs between those network elements are executing correctly. Another example application may use events from various network elements carrying parts of an end user session (such as the radio, core, and/or backhaul nodes) to diagnose how well that session is performing.

A network element 6, 7, 8 in the network 5 communicates with a consumer 21, 31, 41 using a protocol such as Simple Network Management Protocol (SNMP), File Transfer Protocol (FTP), Network Configuration Protocol (NETCONF) or some other protocol for carrying event data. Events can include one or more of: alarms (e.g. of hardware faults, overheating in equipment, software restarts, door alarms caused by intruders), performance counters, session events (e.g. reports of handovers between cells of a wireless network, measurement reports on the power of the signal in cells of a wireless network, end user session set up and tear down messages) and Call Detail Records (CDR).

Figure 3B:
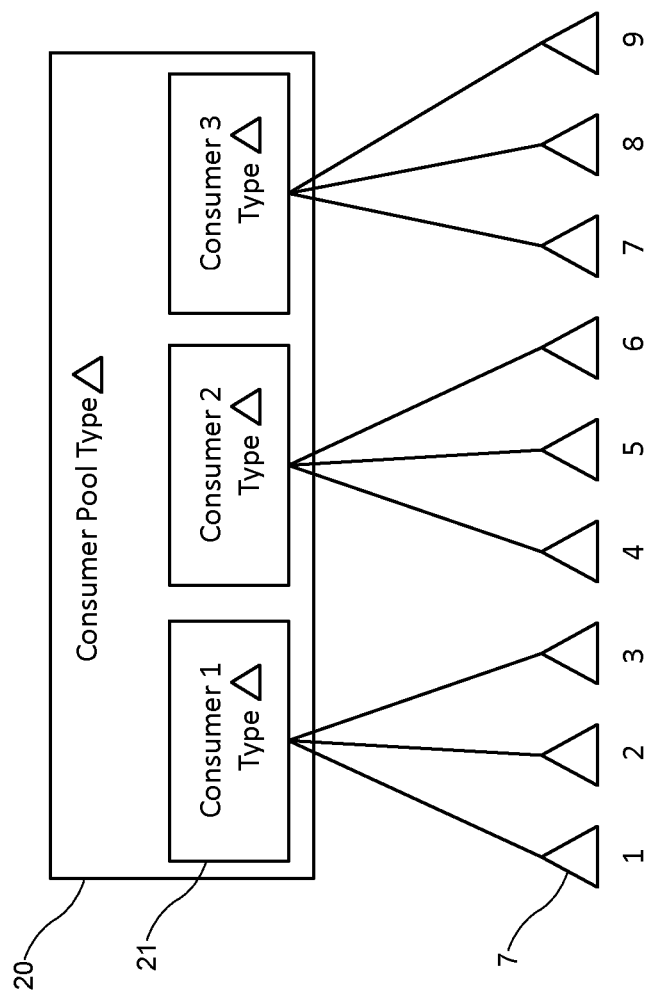
FIG. 3B shows a pool of consumers receiving events from network elements.

Each consumer 21, 31, 41 can have a type which identifies the category of the set of events it is consuming and has available for forwarding. Consumers consuming events from a particular type of network element are typically of the same type. For example, there can be Base Station Consumers, Core Network Consumers, NMS node consumers. A group of consumer instances 21, 31, 41 which consume the same type of event(s) form a consumer pool 20, 30, 40. Each consumer within a pool 20, 30, 40 can be called a consumer instance or a member of the pool. A consumer of base station events may have the type BaseStationConsumer and a consumer of events from core network nodes may have the type CoreNetworkConsumer. All consumers of a particular type are grouped into a single pool. A consumer instance 21, 31, 41 consumes events from a subset of the network elements (NE) of its type in the network. Processing load may be balanced across instances in a consumer pool 20, 30, 40. In FIG. 3A a shape is used to schematically represent the relationship between a consumer and NEs from which that consumer receives event data. FIG. 3B shows a simple example of a relationship between consumers 21 and NEs 7. Consider that there are three instances 21 of consumer in the pool 20 of consumer type triangle and nine NEs 7 which send event data to pool 20. A first instance 21 of the consumer type triangle can consume events from NEs 1-3, a second instance 21 of the consumer type triangle can consume events from NEs 4-6, and a third instance 21 of the consumer type triangle can consume events from NEs 7-9. In this way, the event processing load received from nodes 7 of the network 5 is distributed at the NMS 10 across three instances 21 of the consumer type triangle. An actual consumer instance 21 may process events from a much larger number of NEs.

There can be a different number of consumer instances per pool of each consumer type. The example of FIG. 3 shows six consumers 21 in the pool 20 of consumer type "circle", three consumers 31 in the pool 30 of type "triangle" and one consumer 41 of event type "square" in the pool 40 of type "square". The number of instances of a consumer of a particular type may dynamically vary according to factors such as the number of NEs in the network, the event load from NEs, available resources at the NMS 10.

There can be one or more instances of each application A, B, . . . N. An Application instance 51, 61, 71 is a member of a respective Application Pool 50, 60, 70. All application instances 51, 61, 71 in an application pool 50, 60, 70 execute the same type of task and share the load of those tasks. A consumer instance 21, 31, 41 may forward an event to more than one application A, B, . . . N. Advantageously, each event is forwarded to each application requiring it only once. Each application instance 51, 61, 71 receives events from a forwarded set of events from one or more pools 20, 30, 40 of consumers. In order for the task of an application instance to execute correctly, the application instance 51, 61, 71 should receive events from a particular set of NEs in the network 5.

A controller 11 called an Event Consumption Pool Controller (ECPC) determines members of the pools 20, 30, 40, 50, 60, 70 and controls a set of connections 15 between pools of consumers 20, 30, 40 and pools of application instances 50, 60, 70. A mapping 12 defines the set of connections. The ECPC 11 automatically establishes and maintains the connections between event consumers and applications so that each application receives the events it requires. Advantageously, the minimum number of connections is set up between consumers and applications. Advantageously, duplicates of events are not sent from consumers to an application. Advantageously, the event load on each connection is balanced.

The NMS shown in FIG. 3A can be implemented on one node or on a set of nodes. In effect, each functional unit shown within NMS 10 is a separate running entity. At run time, the functional units can be allocated in whatever way is convenient, such as: all units on one node; each unit on a separate node; all of the ECC units on one node; all of the application units on one node. In a practical deployment, the ECC components may run on a cluster of nodes in a cloud and each application and the ECPC may also run in its own cluster. The functionality of the ECPC 11 can be performed by a centralised control entity of the NMS, which can be implemented as a single node or by a cluster of nodes. Alternatively, the functionality of the ECPC 11 can be distributed across multiple entities in the NMS, such as head nodes in each of the pools 20, 30, 40, 50, 60, 70.

The ECPC 11 controls connections between consumers 21, 31, 41 and applications 51, 61, 71. This can be described as a mapping of the pool of network management event consumers to the pool of instances of the network management applications. The mapping defines connections 15 for forwarding network management event data. Each of the connections is defined between a member of the pool of network management event consumers and a member of the pool of instances of the network management application. In a simplest case there may be a single pool of network management event consumers (e.g. pool 20) and a single pool of instances of a network management application (e.g. application A). The number of instances in each pool of consumers or application may vary dynamically. The number of pools of consumers, pools of applications, or both, may vary dynamically. The size of pools can be modified automatically to cope with current event and application load. An advantage of at least one embodiment is that it facilitates scaling of the size of the NMS. Another advantage is that the method avoids the need for complex manual configuration of the consumers and application instances.

Figure 4:
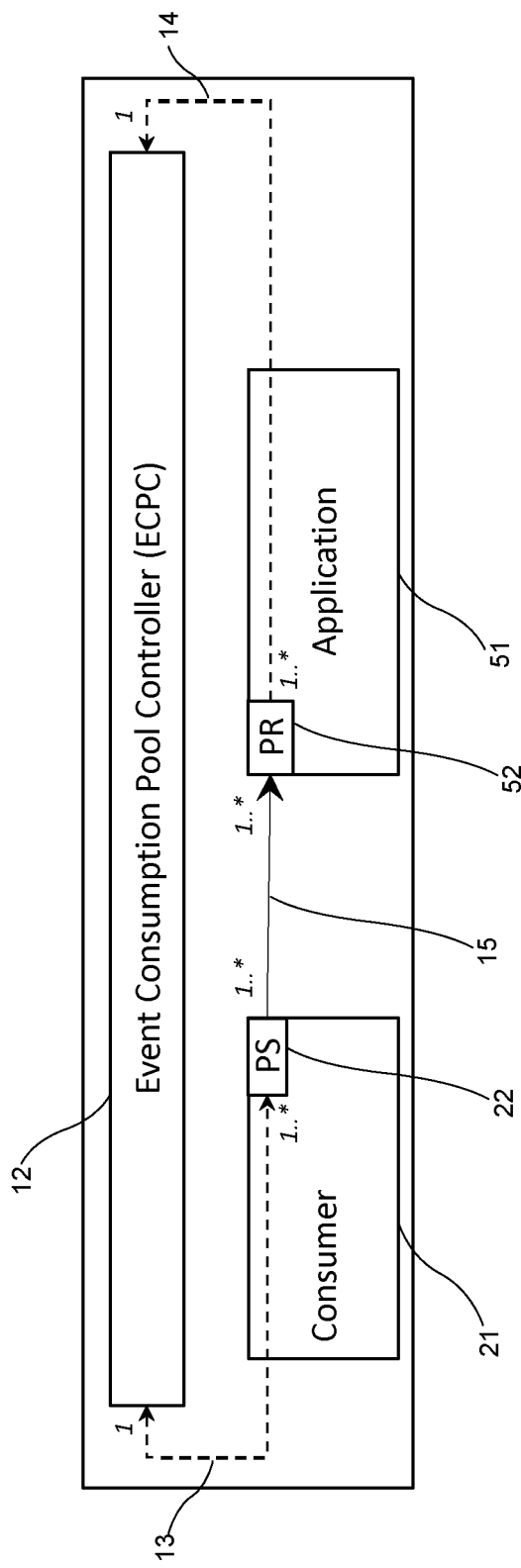
FIG. 4 shows a consumer and an instance of an application.

FIG. 4 shows a single consumer instance 21 and a single application instance 51 of FIG. 3A. The consumer instance 21 has a PS (Pool Sender) 22 which forwards events. Each application instance 51 includes a PR (Pool Receiver) 52 which receives events. The PS 22 can send events to PRs 52 in different applications A, B, . . . N. Advantageously, any PS 22 sends events to only one PR 52 of a particular application. The ECPC 11 can ensure that connections are established so that each PS in a consumer pool is connected to at most one PR in each application to which events are being forwarded. In this way, events from all NEs being handled by the consumer pool are forwarded to each application. Events from a particular NE 7 are always forwarded to the same application instance using the PS-PR pair connection of the consumer handling that NE.

Applications that consume events such as event correlation systems based on frameworks require that specific events from a particular NE should be correlated in the same application instance. For example, events for a particular cell on a base station should all be forwarded to the same aggregation application so that statistics such as dropped call counts for that cell can all be calculated in that application instance. In this method specific events are guaranteed to appear in a single application instance because all events from a particular consumer (and NE served by that consumer) are forwarded to one instance in an application.

When a consumer instance 21, 31, 41 or application instance 51, 61, 71 is added to, or removed from, a respective consumer pool or application pool, the ECPC 11 can automatically rebalance the PS-PR connections. There are various possible algorithms for allocation of application instances to consumer instances, such as: round robin allocation, load-aware allocation. In a load-aware allocation consumer instances in a consumer pool are assigned to application instances in an application pool using actual or estimated measurements of event loads on consumer and/or application instances.

The Event Consumption Pool Controller (ECPC) 11, the Pool Sender (PS) 22 in a consumer instance 21, and the Pool Receiver (PR) 52 in an application instance 51 interact 13, 14 to provide balanced consumption of events. In one embodiment, these software entities can use an inter-process communication mechanism such as Distributed Hash Tables to reliably share control information. The inter-process communication mechanism distributes connection management information across the software entities and allows control messages to be passed between those entities.

Figure 5:
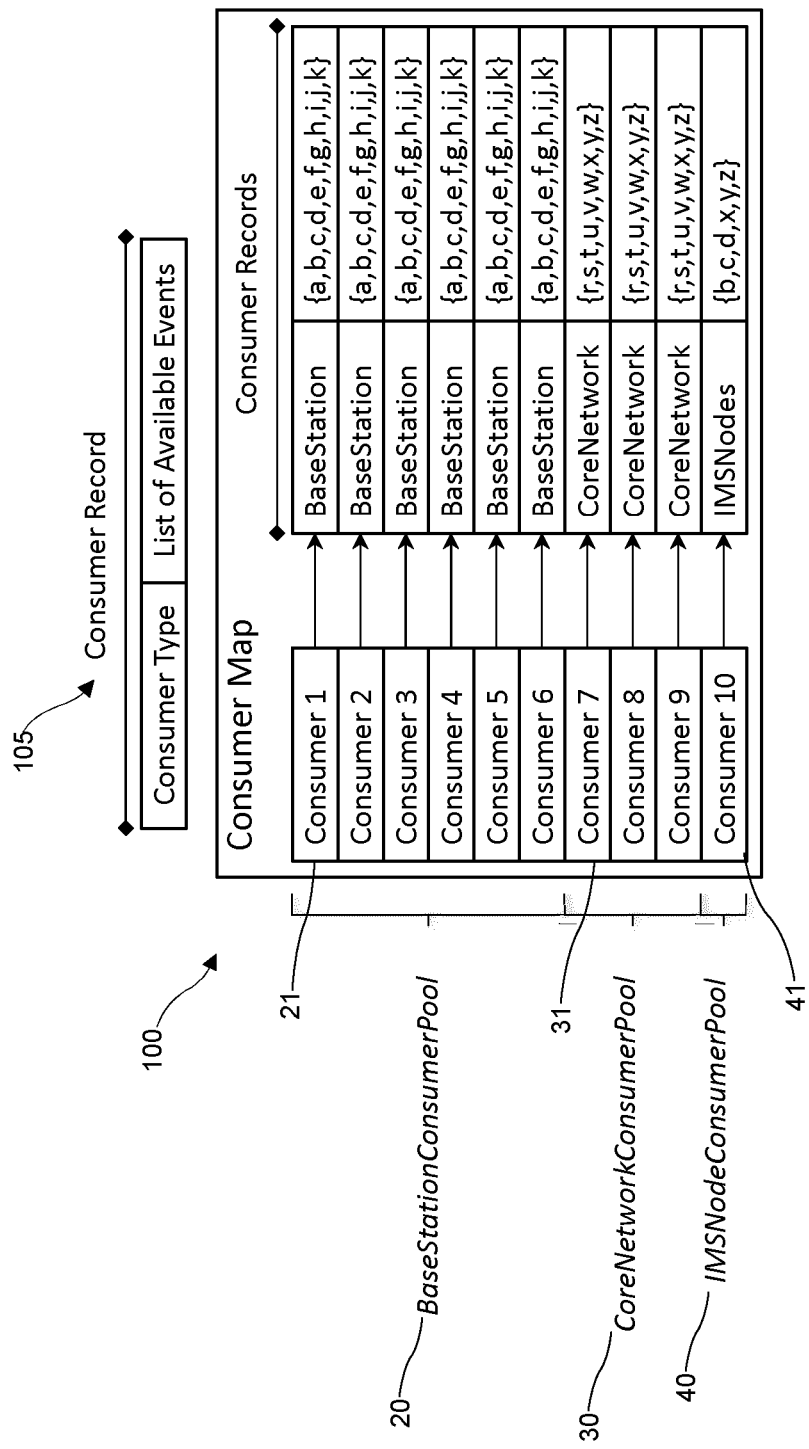
FIG. 5 shows a consumer map used in the network management system.
Figure 6:
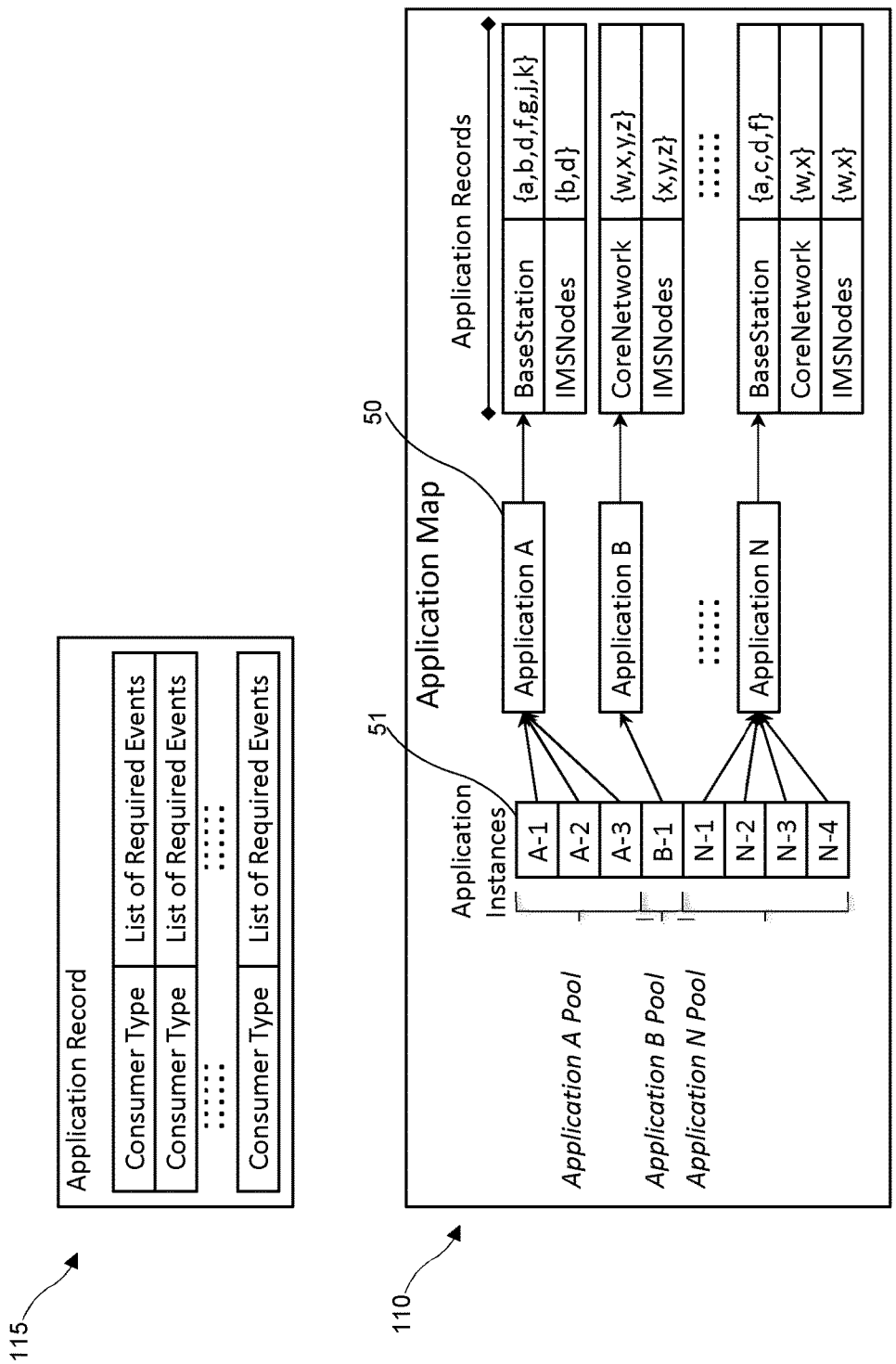
FIG. 6 shows an application map used in the network management system.
Figure 7:
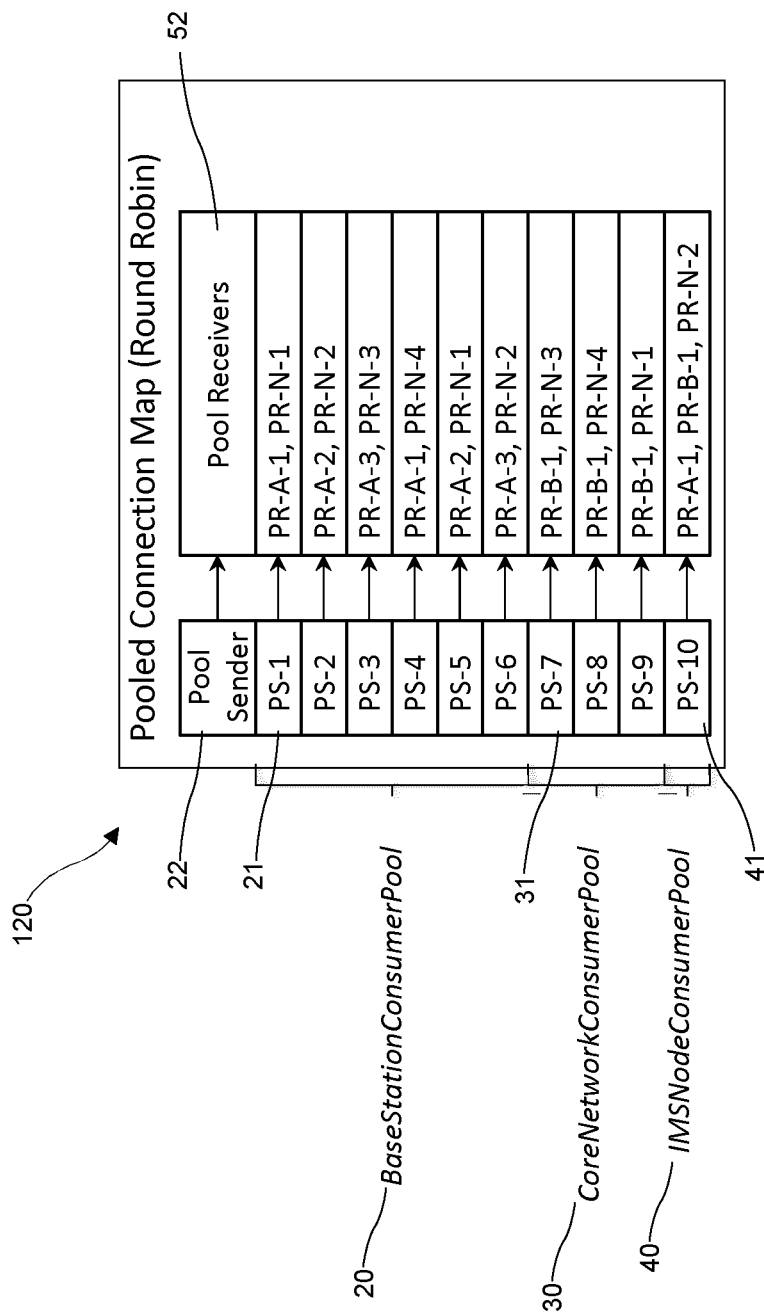
FIG. 7 shows a connection map used in the network management system.

Examples of data structures that are shared between the software entities are shown in FIGS. 5 to 7. Depending on the implementation, these data structures may be centrally stored at the ECPC 11, or the data may be distributed across the consumers and applications.

FIG. 5 shows a Consumer Map 100 used to hold the type of each consumer 21, 31, 41 and the list of events it has available. Consumers of a particular type are grouped together as a Consumer Pool 20. The BaseStationConsumer Pool 20, CoreNetworkConsumerPool 30, and IMSNodeConsumerPool 40 shown in FIG. 5 are examples of consumer pools. Each consumer instance 21, 31, 41 is configured with a consumer record 105 specifying its consumer type and the list of event types it can consume. Each consumer instance 21, 31, 41 receives events from a subset of NEs 6, 7, 8 of the network 5, as explained at FIG. 3B. The ECPC 11 uses the consumer map 100 to manage each consumer pool 20, 30, 40. As noted above, the consumer map 100 may be stored centrally at the ECPC 11 or contents of the consumer map may be stored in a distributed manner at each consumer, or a head node of each consumer pool. In the case of central storage the ECPC 11 may receive data from the consumers to create the consumer records 105 (e.g. by discovering new consumers joining the pool). In the case of distributed storage, the ECPC 11 may subscribe to notifications sent from consumers of any changes to consumer records stored at the consumers. In this way, the ECPC 11 is aware of any changes to the NMS which may require a change to the mapping between consumers and applications. A distributed storage scheme can, for example, use an existing distributed storage Hazelcast™. Hazelcast™ allows all running instances (ECPC 11, consumers, applications) to access the maps managed by Hazelcast™ as if they were local maps.

FIG. 6 shows an Application Map 110 used to hold the type and identities of events required by each application A, B, . . . N. Each application instance 51, 61, 71 is configured with an application record 115 of the consumer types and event lists they require. The ECPC 11 maintains the application map 110 and creates and maintains an Application Pool 50, 60, 70 for each application A, B, . . . N using the consumer types and event lists sent to it by each PR when they start up. Each application instance 51, 61, 71 is allocated to the pool of its application A, B, . . . N. Similarly to the consumer map, the application map 110 may be stored centrally at the ECPC 11 or contents of the application map may be stored in a distributed manner at each application instance, or a head node of each application pool. In the case of central storage the ECPC 11 may receive data from the applications to create the application records 115 (e.g. by discovering new applications joining the pool). In the case of distributed storage, the ECPC 11 may subscribe to notifications sent from applications of any changes to application records. A distributed storage scheme can, for example, use Hazelcast™. In this way, the ECPC 11 is aware of any changes to the NMS which may require a change to the mapping between consumers and applications.

The ECPC 11 builds and maintains a Pooled Connection Map 120 to administer the connections between consumers 21, 31, 41 and application instances 51, 61, 71. The example in FIG. 7 shows that each PS 22 sends events to a single PR 52 in each application A, B, . . . N that requires events to be forwarded to it. FIG. 7 shows an example of a pool connection map 120 created using a round robin allocation scheme. The round robin allocation scheme connects PS instances 22 and PR instances 52 in ascending order, restarting allocation at the first instance in a pool when the last instance in the pool is reached. For example, the six PS instances are connected to the three PR instances. PS-1 is connected to PR-A-1, PS-2 is connected to PR-A-2, PS-3 is connected to PR-A-3, PS-4 is connected to PR-A-1 (returning to the first instance of the PR pool), PS-5 is connected to PR-A-2 (continuing in order through the instances of the PR pool), and PS-6 is connected to PR-A-3.

In this example it can be seen that each consumer instance 21, 31, 41 is connected to only one instance 51, 61, 71 of an application, e.g. PS-1 (of pool 20) is only connected to PR-A-1 (of application pool 50) and is not connected to PR-A-2 or PR-A-3 of the same application pool 50. This condition holds for all consumer instances PS-1 to PS-10. An instance of an application may receive events from different consumer instances of the same consumer type, e.g. PR-A-1 receives events from PS-1 and PS-4 of the same consumer pool 20. An instance of an application may receive events from consumer instances of different consumer type, e.g. PR-A-1 receives events from PS-1 (of consumer pool 20) and PS-10 (of consumer pool 40).

More complex allocation schemes, such as a scheme that considers the current load on pool instances, can be used. The ECPC 11 can automatically manage connections between PSs and PRs by listening to notifications of changes on the consumer map (100, FIG. 5) and application map (110, FIG. 6). When either map 100, 110 is changed, the ECPC 11 updates the connections 15 between consumer instances 21, 31, 41 and application instances 51, 61, 71 as appropriate using its allocation algorithm.

Figure 8:
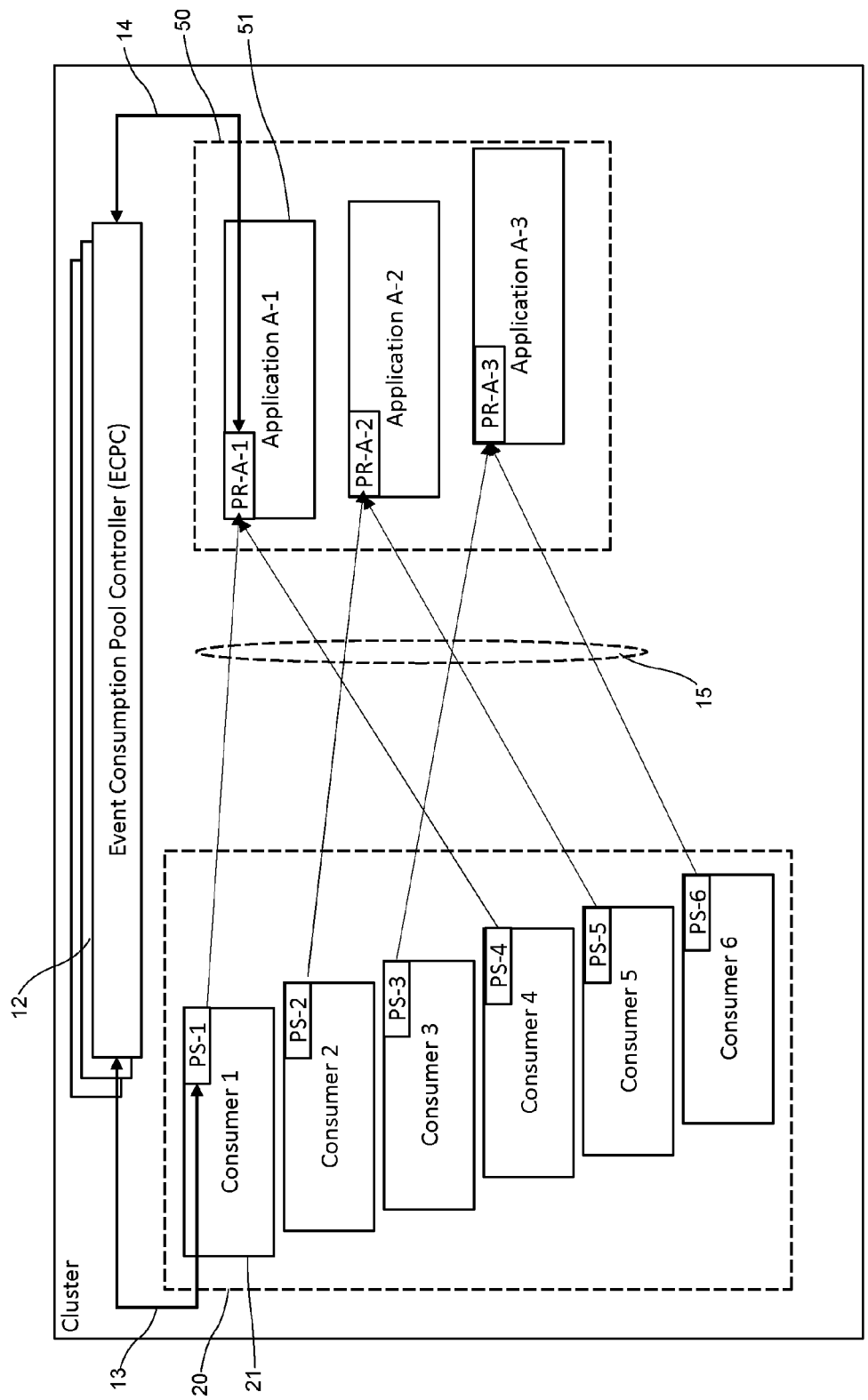
FIG. 8 shows connections between one pool of consumers and instances of one application.
Figure 9:
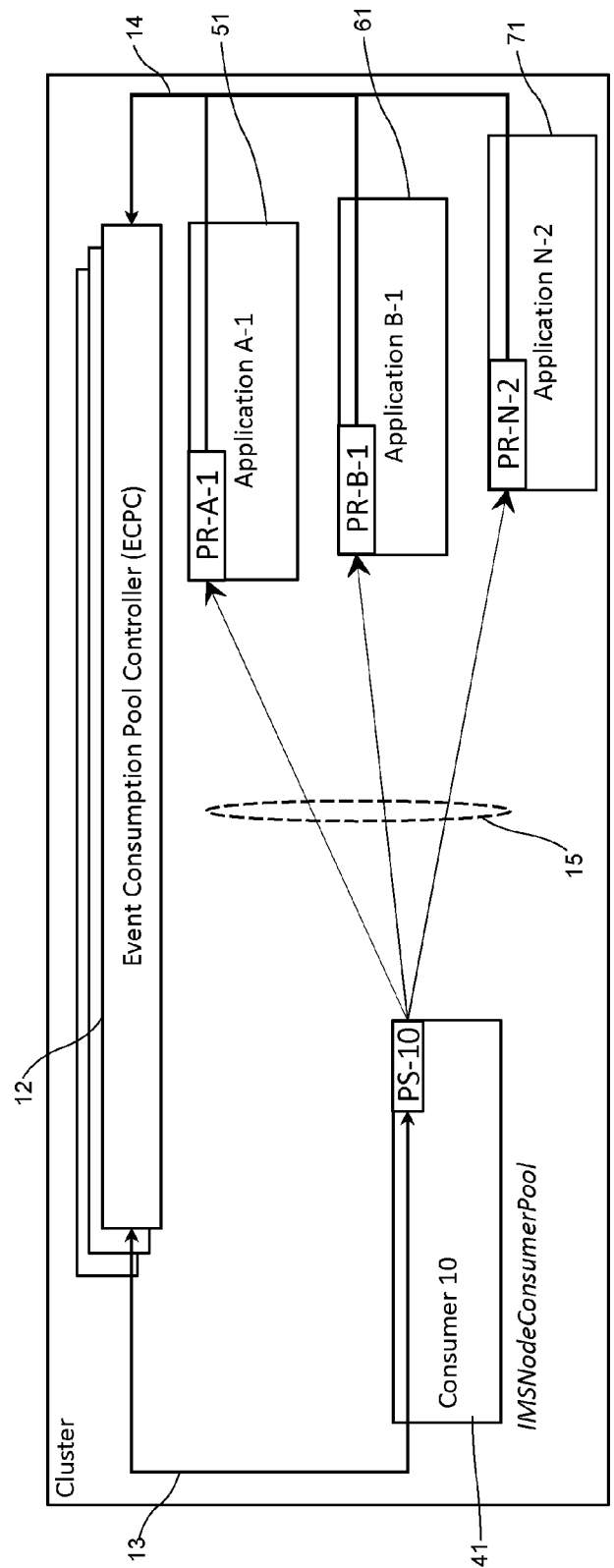
FIG. 9 shows connections between a consumer and multiple applications.

FIG. 8 shows the connections 15 between the six instances 21 in the BaseStation ConsumerPool 20 and the three instances 51 in Application A pool 50. Here, each PR instance receives events from two PS instances. FIG. 9 shows the connections between the PS of the single consumer instance 41 in the IMSNodeConsumerPool 40 feeding PR instances in Applications A, B, and N.

Figure 10:
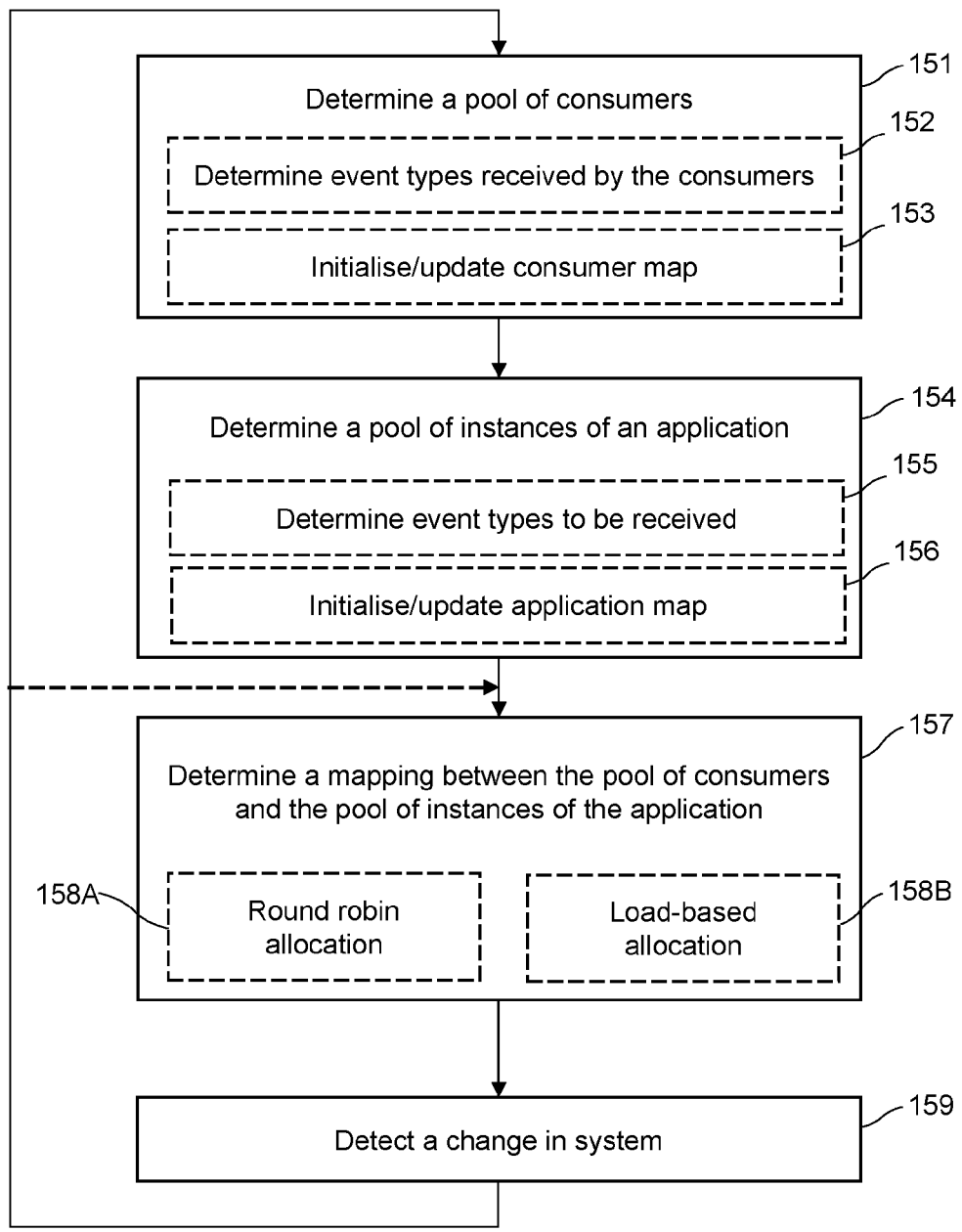
FIG. 10 shows a method of operating a network management system according to an embodiment.

FIG. 10 shows a method of operating a network management system 10 of a communication network 5. The method can be performed by a controller, such as an ECPC described above. The method determines 151 a pool of consumers in the network management system 10. There may be a single pool of consumers (e.g. pool 20, FIG. 3A) or multiple pools of consumers (e.g. pools 20, 30, 40). The consumers are arranged to receive network management event data from network elements 5, 6, 7 of the communication network 5. The method may determine 152 event types received by the consumers. In the case of a centralised controller 11, the controller may determine members of the pool of consumers by information 13 (FIGS. 3A, 4) received from the consumers, by an exchange of signalling 13 between the controller and the consumers. The method may initialise 153 a consumer map, such as the consumer map 100, FIG. 5.

The method determines 154 a pool of instances of a network management application in the network management system 10. There may be a single pool of instances of an application (e.g. pool 50, FIG. 3A) or multiple pools, with a pool per application (e.g. pools 50, 60, 70). The pool of instances of the network management application are arranged to process the network management event data. The method may determine 155 event types to be received by the instances of the application. In the case of a centralised controller 11, the controller may determine members of the pool of instances of the application by information 14 (FIGS. 3A, 4) received from the instances of the application, or by an exchange of signalling 14 between a controller and the instances of the application. The method may initialise an application map, such as the application map 110, FIG. 6.

The method determines 157 a mapping between the pool of consumers and the pool of instances of the network management application. The mapping defines connections for forwarding network management event data. An example connection map is shown in FIG. 7. Each of the connections is defined between a member of the pool of consumers and a member of the pool of instances of the network management application. The mapping is constrained such that any member of the pool of consumers is connected to a single member of the pool of instances of the network management application. The determination of the mapping can use a round robin allocation scheme 158A, a load-based allocation scheme 158B or some other method. The method can be repeated. For example, the method may detect 159 a change in the system and then return to steps 151 and 154 or to step 157. The consumer map and/or application map may be updated in response to any detected changes to members of the pools. The method may determine a new mapping, or may update the existing mapping. A change in the system may be caused, for example, by: an addition or removal of at least one consumer; an addition or removal of at least one an instance of an application; an addition or removal of at least one application. Some possible changes to the system are described below.

Consumer Addition to and Removal from Consumer Pool

When a new consumer starts, a record of the consumer (105, FIG. 5) is inserted into the consumer map (100, FIG. 5). If a consumer pool for the consumer type does not already exist in the consumer map, then one is created. In an implementation where data is stored in a distributed manner at consumers, the consumer makes a change to the map to add the new consumer record (and consumer pool). The ECPC 11 monitors the map and detects when the map is changed. In an implementation where data is stored centrally at the ECPC 11, the ECPC 11 can discover the arrival of a new consumer and gather information from the new consumer.

On shutdown of a consumer, its record is removed from the consumer map and pool. If it is the last instance of a consumer pool, the consumer pool is itself removed from the consumer map.

Application Instance Addition to and Removal from Application Pool

When a new instance of an application is discovered (or starts up), a record of the application instance is inserted into the application map (110, FIG. 6). If an application pool for the application does not already exist in the application map, then one is created. As described above for the consumer map, data can be stored in a distributed manner or centrally at the ECPC 11.

On shutdown of an application instance, its record is removed from the application map and pool. If it is the last instance of an application pool, the application pool is itself removed from the application map.

ECPC Handling of Change to Consumer or Application Map

If an application instance is added to, or removed from, the application map the ECPC 11 builds a list of all consumer pools that are feeding the application pool in which the change has occurred. It iterates over the list of consumer pools and reallocates the connections between each consumer pool on the list and the application pool in question using procedures, such as those described elsewhere in this specification (round robin allocation, load aware allocation etc.). An example method performed by an ECPC 11 is shown in FIG. 11. At step 161 the ECPC 11 receives a notification of a change to the application map, such as an addition of a new application instance or a removal of an existing application instance. At step 162 the ECPC 11 reads a list of consumer types involved in the change to the application map. At step 164 connections are allocated (in the case of an addition of a new application instance) or reallocated (in the case of a removal of an existing application instance). This is repeated until an end of the consumer type list is reached (step 163).

If a consumer is added to or removed from the consumer map, the ECPC 11 builds a list of all application pools that are being fed by the consumer pool in which the change has occurred. It iterates over the list of application pools and reallocates the connections between each application pool on the list and the consumer pool in question using procedures such as those described above. An example method performed by an ECPC 11 is shown in FIG. 12. At step 165 the ECPC 11 receives a notification of a change to the consumer map, such as an addition of a new consumer or a removal of an existing consumer. At step 166 the ECPC 11 reads a list of applications involved in the change to the consumer map. At step 168 connections are allocated (in the case of an addition of a new consumer) or reallocated (in the case of a removal of an existing consumer). This is repeated until an end of the application list is reached (step 167).

As described above, there are various ways in which the mapping between consumer and application pools can be performed (157, FIG. 10). Some possible allocation schemes are now described but it will be understood that other allocation schemes can be used. Allocation schemes can use real measurements of load or estimations of load on consumer or application instances, or differing capabilities of the hardware on which instances are running (such as differing CPU, memory bandwidth) to spread the event load more fairly.

Round Robin Allocation Between Consumer and Application Pools

Figure 13:
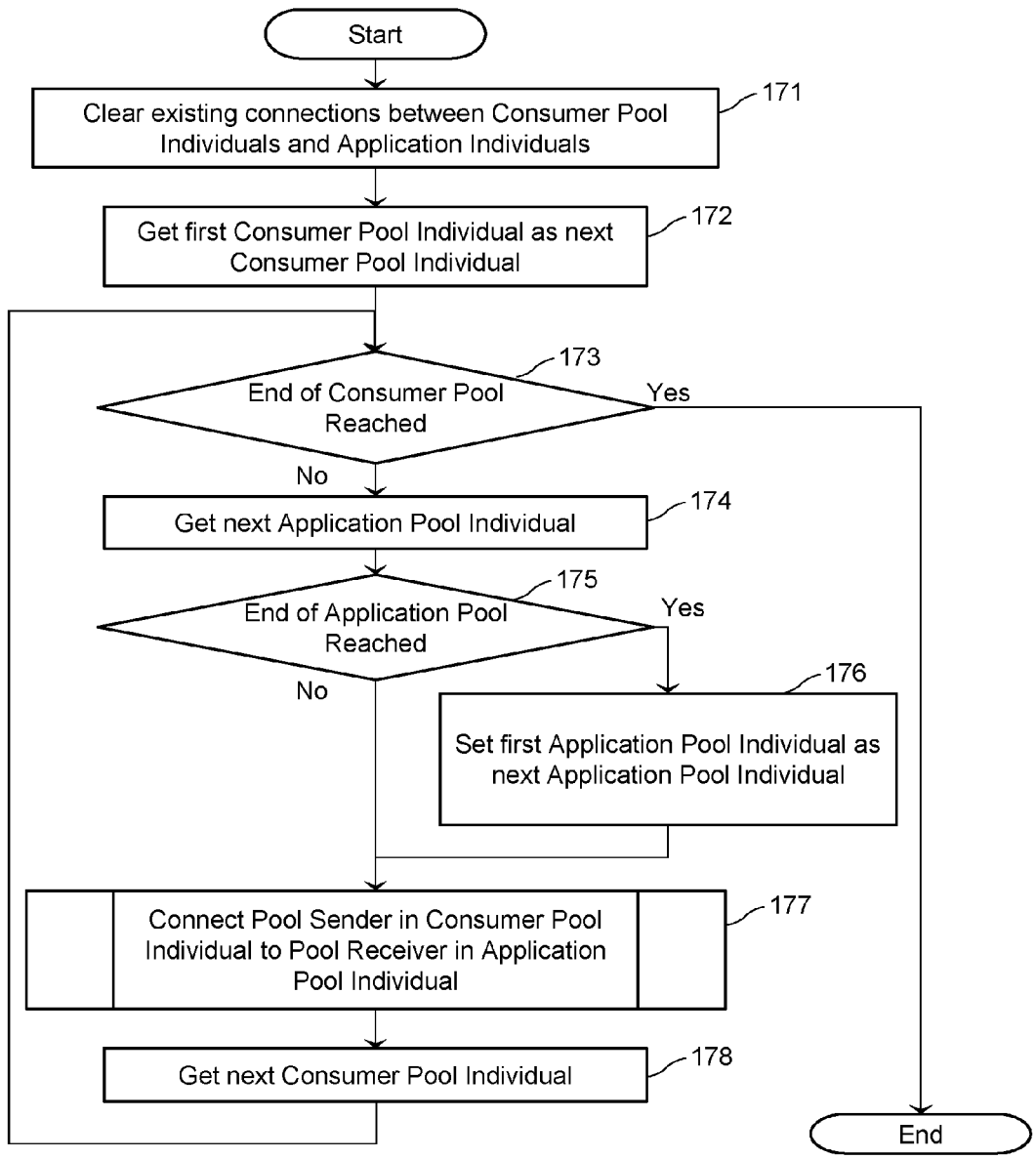
FIG. 13 shows a method of forming connections using a round robin scheme.

FIG. 13 shows a round-robin approach to connection allocation between consumer pool instances and application pool instances. This is one of the simplest allocation schemes. Firstly, at step 171, all existing connections between the consumer pool and application pool are cleared. The algorithm then iterates across the list of instances in the consumer pool and creates a connection between the next PS in the consumer pool and the next PR in the application pool as they appear in each list. If the end of the application pool list is reached, the algorithm selects the first instance as the next instance on the application list. In detail, step 172 selects the first (next) consumer pool member and step 174 selects the first (next) application pool member. The consumer pool member selected at step 172 and the application pool member selected at step 174 are connected at step 177. The method then selects the next consumer pool member (step 178) and repeats steps 174, 176 and 177 until the end of the consumer pool is reached. Steps 175, 176 ensure that when the end of the application pool is reached, the method returns to the first member of the application pool, thereby providing a round robin selection of the application pool members. An example of a connection map resulting from round robin allocation is shown in FIG. 7.

This method ensures that each consumer instance in a pool is connected to one and only one application instance in each application that requires events from that consumer pool. There is no requirement for all application instances in an application pool be connected to a consumer instance in a consumer pool as long as all consumer instances in a consumer pool are connected to a single (i.e. one and only one) application instance in each application pool.

Figure 14:
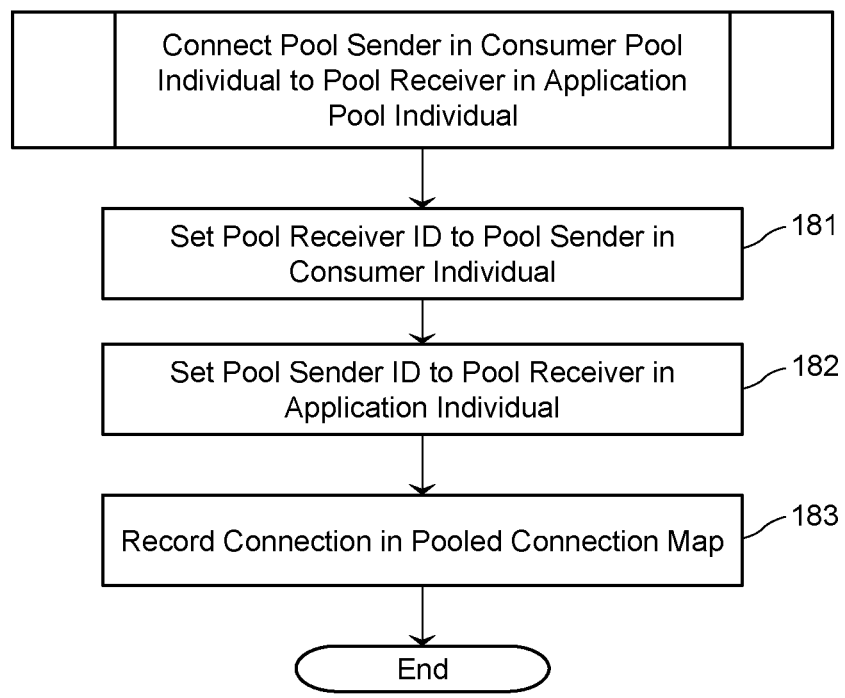
FIG. 14 shows a method of configuring consumers and application instances.

FIG. 14 shows a method performed once a mapping has been determined between a consumer and an application. In order to connect a PS to a PR, the consumer instance is informed of the address of the PS of the application instance (step 181) and the application instance is informed of the address of the PR of the consumer instance (step 182). At step 183 the connection is recorded in the connection map (120, FIG. 7).

Load Aware Allocation between Consumer and Application Pools

Figure 15A:
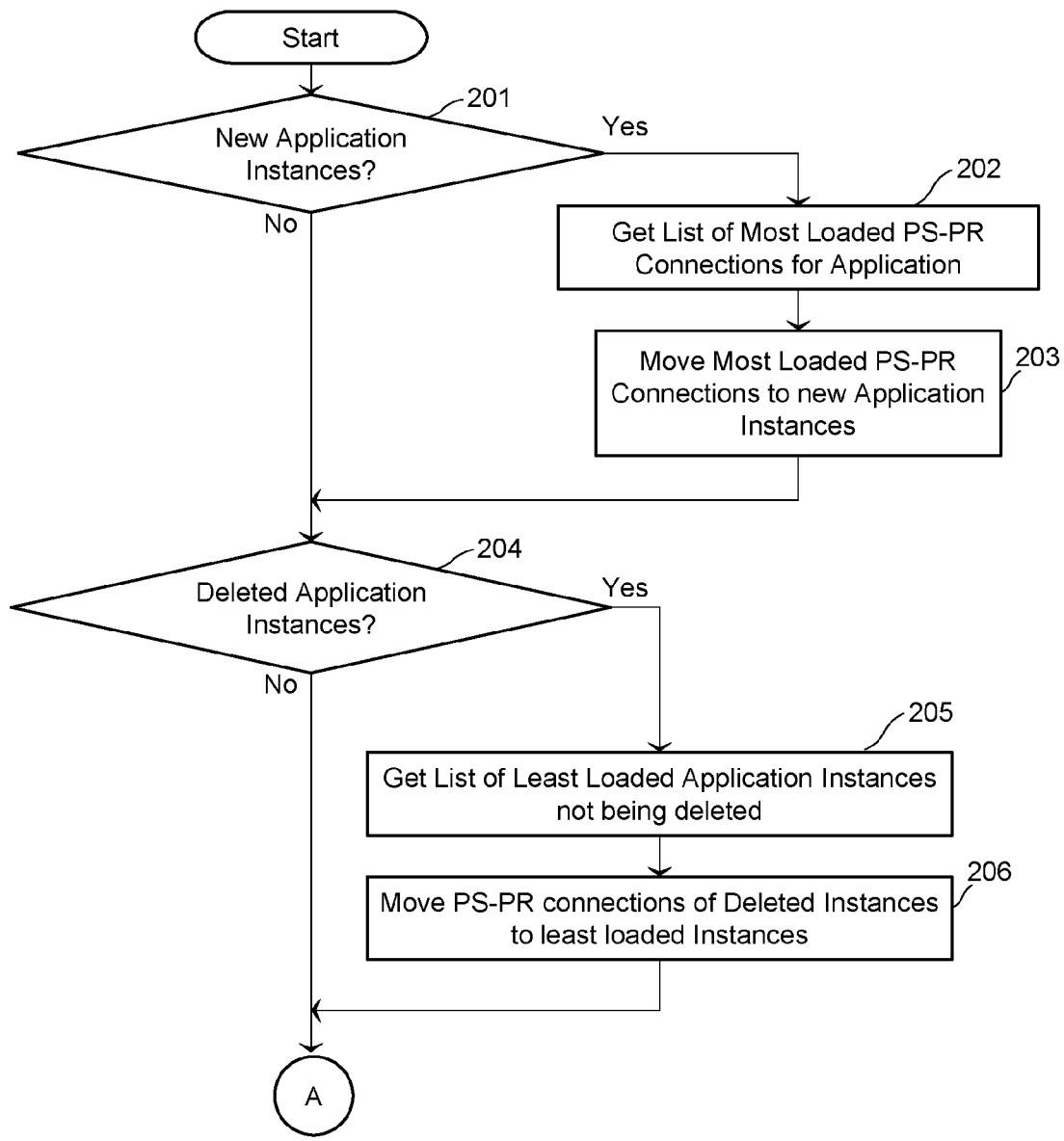
FIGS. 15A and 15B show a method of forming connections using a load-aware allocation scheme.
Figure 15B:
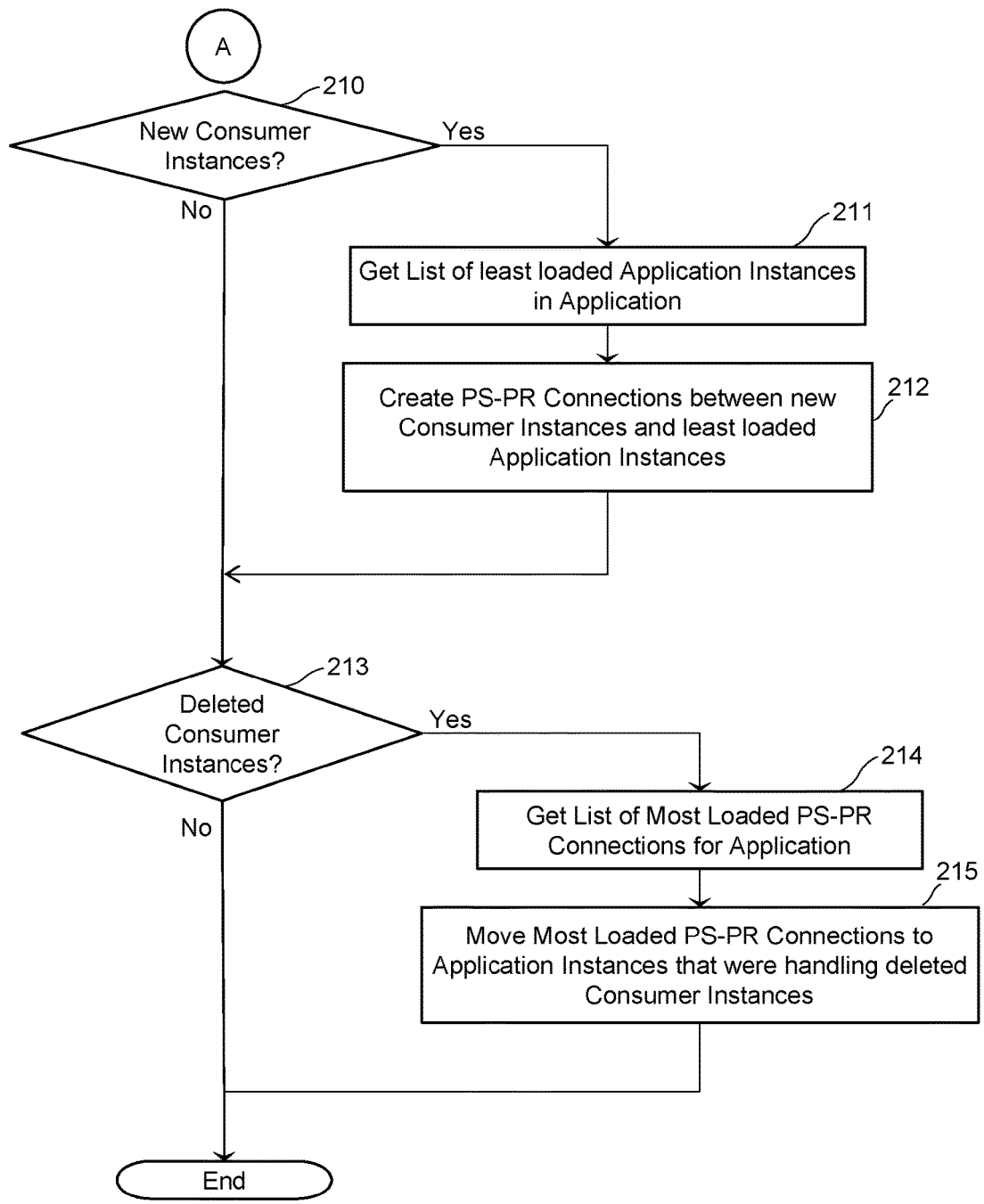

The method shown in FIGS. 15A, 15B describes load-aware allocation of connections between PSs in consumer pool instances and PRs in application pool instances. FIG. 15A shows the case of addition of application instances to a pool. If a new application instance is detected 201, the method examines 202 each of the PS-PR connections of each instance in the application to determine which connections are carrying the heaviest traffic load. A configurable percentage of these connections are moved 203 to the new application instance. In turn, each PS-PR connection is disconnected from its current application instance and re-connected to a new application instance. If removal of an application instance is detected 204, the algorithm creates 205 a list of the applications that are least heavily loaded.

Each PS-PR connection of the application instances being deleted are moved 206 and distributed across the least loaded application instances.

FIG. 15B shows the case of addition of consumer instances to a pool. If a new consumer instance is detected 210, the algorithm creates 211 a list of the application instances that are least loaded. PS-PR connections are created 212 from each new consumer instance to those least loaded application instances. If removal of a consumer instance is detected 213, the algorithm creates 214 a list of the most heavily loaded application instances. A configurable percentage of these connections are moved 215 to the application instances that were carrying load for the deleted consumer instances.

This method, although more complex than the round robin algorithm described above, has the advantage of causing less disruption during connection changes.

Event Consumption

Figure 16:
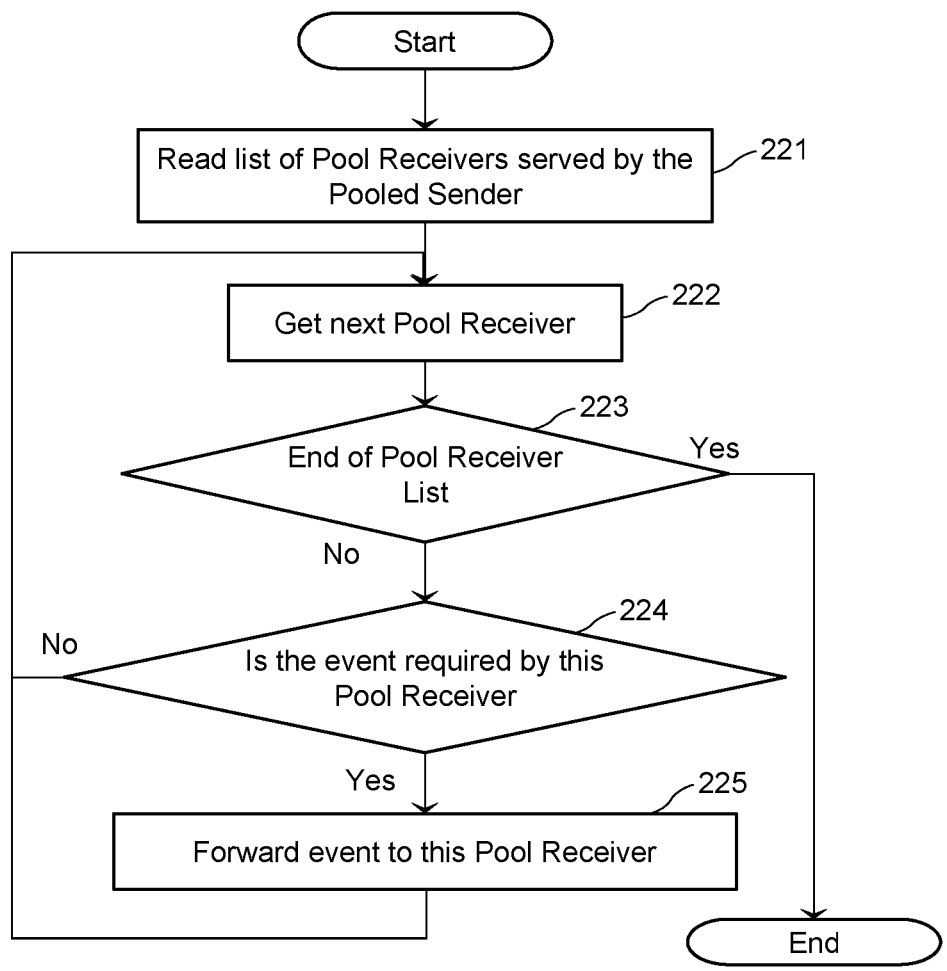
FIG. 16 shows a method of forwarding event data at a consumer.

FIG. 16 shows an example of a method performed at a consumer instance on reception of a network management event. An event is received by a consumer instance. Step 221 reads a list of pool receivers (PR) served by the pool sender (PS) of that consumer. Steps 222, 223 proceed through the list of PRs in turn. Step 224 determines if the received event is required by the currently selected PR. If so, the event is forwarded at step 225 to the currently selected PR. This method has the function of sending event data to PRs to the application instances which require that event data.

The method shown in FIG. 16 is straightforward and efficient because all connections between a PS and the PRs to which it is forwarding have already been established by the ECPC 11. This method is performed each time an event is received and, because of its simplicity, the execution time is very short and resource usage for event consumption in the method is very low.

More than one ECPC 11 may be running in the system to give redundancy, with one ECPC nominated as being the master ECPC. If the master ECPC fails, a process monitoring mechanism can inform the other ECPCs, and another ECPC can be nominated as the master ECPC. Assuming all connection information is reliably shared, the new master ECPC can resume management of subscriptions from the point at which the failed master ECPC stopped management.

It is possible to provide redundancy in the NMS 10 by providing a new instance to be brought into service, on demand, when another instance is failing. Another possibility is to have a mirrored set (e.g. mirrored pair) of instances, with one being held in standby. In this case, a consumer 21, 31, 41 can send event data to the main application instance and the one or more application instances forming part of the mirrored set. It is noted that this is not a violation of the "one consumer is connected to one application instance" rule, as the event data is sent to a set of instances (main+standby) which function as a single instance.

At least one embodiment may have one or more of the following advantages. At least one embodiment may permit automatic handling of connections between pools of event consumers and pools of application instances in a scalable manner, avoiding the need for manual configuration. At least one embodiment may allow consumer pools and application pools to be independently increased or reduced in size, allowing event based network management systems to scale easily. The use of pools can allow the task of processing incoming events to be balanced across the members of the pool. The size of the pool can be modified to cope with the current event load. At least one embodiment may scale well because there is no duplication of events. Events are only forwarded from consumers to applications that require them. At least one embodiment may automatically adapt to changes in load experienced by instance consumer and application instances by automatically adapting pool sizes based on the prevailing load. At least one embodiment may allow redundancy within a pool. If a consumer or application instance or an ECPC fails, the other running consumer or application instances or ECPC can automatically absorb the load of the failed entity. At least one embodiment may avoid the need for applications to create their own forwarding mechanisms for load balancing. At least one embodiment may allow faster forwarding of event data because all connections between Pool Senders and Pool Receivers are pre-configured without the need to forward data based on the content of events.

Figure 17:
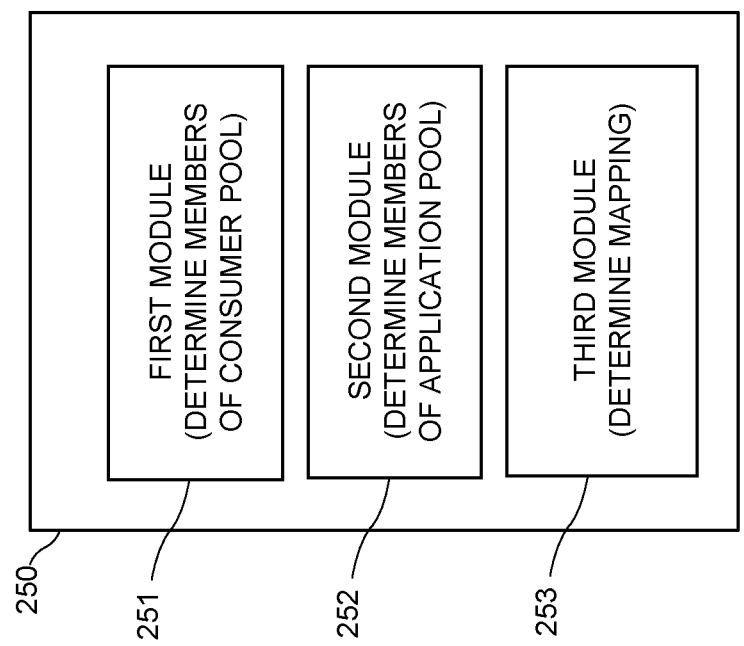
FIG. 17 shows a simplified diagram of functional units of a controller in the network management system.
Figure 18:
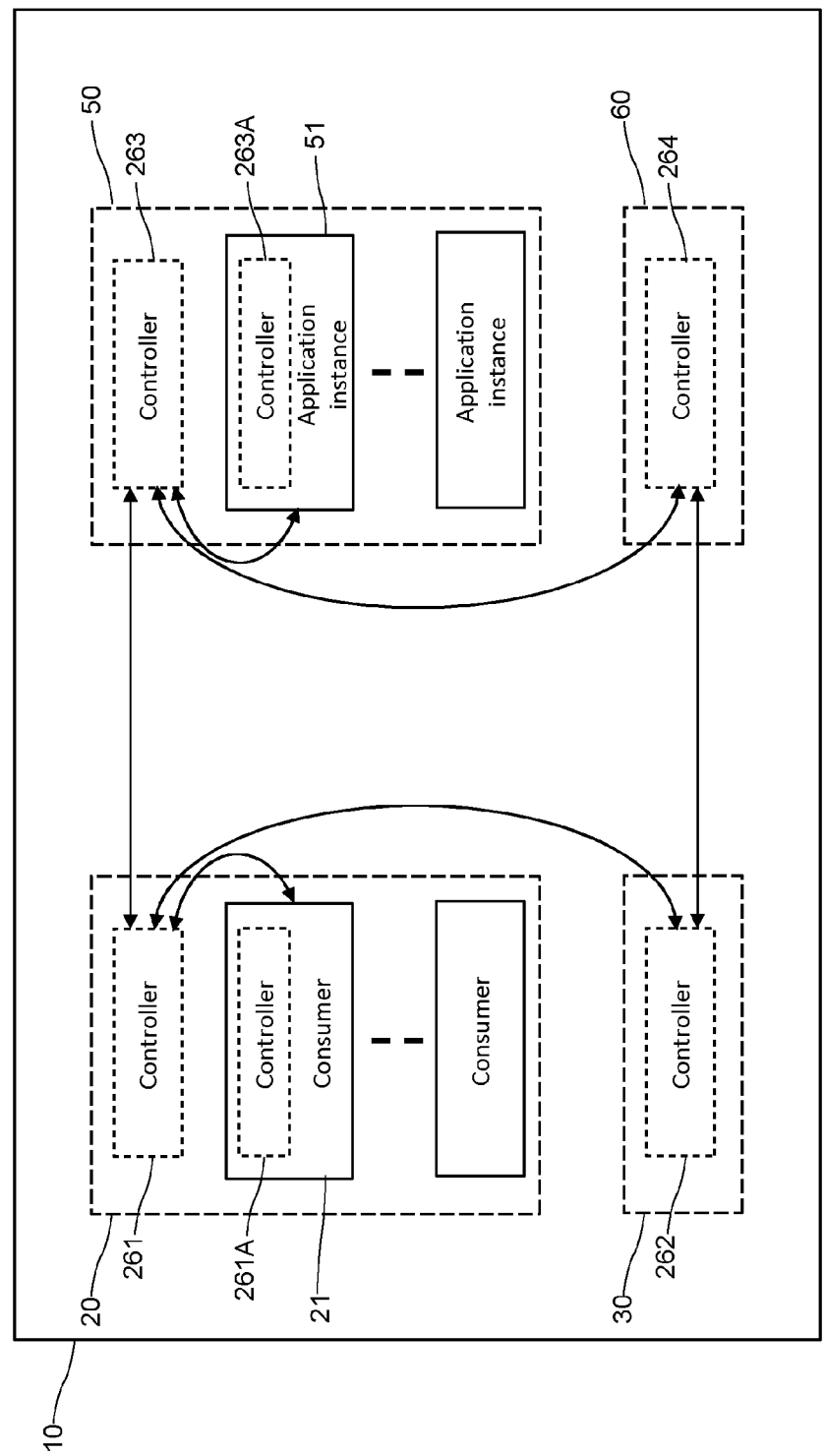
FIG. 18 shows a network management system with distributed controllers.

FIG. 17 illustrates functional units of a control entity 250 for use in the NMS 10 which may perform the steps of FIG. 10 and/or FIGS. 13-16. It will be understood that the units illustrated in FIG. 17 are functional units, and may be realised in any appropriate combination of hardware and/or software. Control entity 250 may correspond to a centralised ECPC 11, or to functionality which is implemented at one of the nodes of a distributed ECPC. A first module 251 is configured to determine members of a pool 20, 30, 40 of consumers 21, 31, 41 in the NMS 10. A second module 252 is configured to determine members of a pool 50, 60, 70 of instances 51, 61, 71 of a network management application (A, B, N) in the NMS 10. A third module 253 is configured to determine a mapping between the pool 20 of consumers 21 and the pool 50 of instances 51 of the network management application.

There are several possible ways in which the storage of data and control for determining connections can be implemented:

(i) data stored centrally and centralised control;

(ii) data stored in a distributed manner and centralised control;

(iii) data stored in a distributed manner and distributed control (fully distributed).

In option (i) a central ECPC 11 can gather and store all information about members of the consumer pool(s) and application pool(s). The consumer map (100, FIG. 5) and application map (110, FIG. 6) can be stored at the central ECPC 11. The central ECPC 11 can also determine the mapping of members of the consumer pool(s) to members of the application pool(s).

In option (ii) information about members of the consumer pool(s) and application pool(s) is stored in a distributed manner across the pools. For example, nodes may use Hazelcast™. There is no need for a central ECPC to locally store this data. A central ECPC 11 can determine the mapping of members of the consumer pool(s) to members of the application pool(s). At the time of forming the mapping, the ECPC 11 can access the information from the distributed locations where it is stored. Optionally, the ECPC may locally cache a complete connection map and/or application map at the time of determining the connection mapping.

In option (iii) information about members of the consumer pool(s) and application pool(s) is stored in a distributed manner across the pools. There is no central ECPC to locally store this data. Each node may store a subset of the overall information of the system (e.g. a consumer may store information about itself and neighbouring consumers in the pool) or each node may store a complete set of the overall information of the system. A local controller determines the mapping of members of the consumer pool(s) to members of the application pool(s). There are multiple controllers. FIG.

18 schematically shows an example of a NMS with a distributed set of controllers. A controller 261, 262, 263, 264 is associated with each pool of consumers 20, 30. Each controller 261, 262, 263, 264 can comprise the functional units, or a sub-set of the functional units, shown in FIG. 17. Each controller 261, 262, 263, 264 may perform the steps of FIG. 10 and/or FIGS. 13-16. There is a first controller 261 associated with consumer pool 20 and another controller 262 associated with consumer pool 30. Similarly, a controller is associated with each application pool 50, 60. There is a first controller 263 associated with application pool 50 and another controller 264 associated with application pool 60. A controller 261, 262, 263, 264 may form part of a consumer/application instance (as shown by controllers 261A, 263A) or may be separate from the consumer/application instance. A controller 261, 262, 263, 264 may be associated with, or form part of, a head consumer (or application) in a pool. The controller associated with a pool can be configured to gather information about members of that pool and share information with other controllers. In this way, each controller 261, 262, 263, 264 determines members of the consumer pool and members of the application pool by information received from other controllers. Functionality for forming the mapping between members of the consumer pool(s) and application(s) pool can be located at each controller 261, 262, 263, 264. In one example, each controller may be responsible for determining a connection mapping for a subset of the overall system. For example, if there is a controller per consumer pool, the controller can be responsible for determining a mapping from consumers in that consumer pool. In an example of a controller per consumer, the controller can be responsible for determining a mapping from that consumer.

Figure 19:
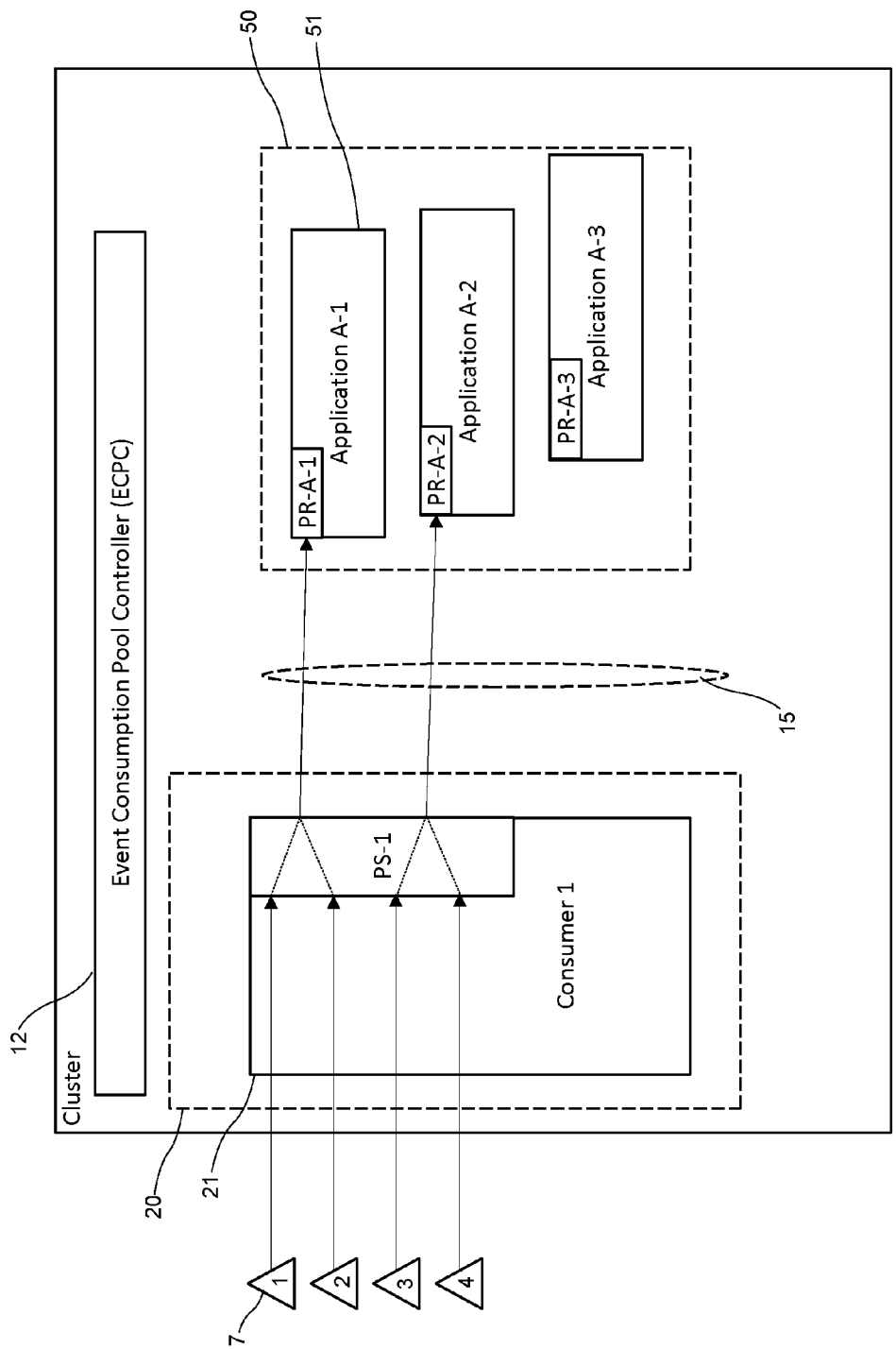
FIG. 19 shows connections between a consumer and multiple instances of an application.

In the examples described above, the mapping between the pool of consumers and the pool of instances of the network management application(s) can be constrained such that any member of the pool of consumers is connected to a single member 51 of the pool 50 of instances of the network management application. This ensures that all network management event data from a particular network element is forwarded to a single member 51 of the pool 50 of instances of the network management application. Typically, the number of consumers is (much) greater than the number of instances of the network management application. In some cases, such as where the number of consumers is smaller than the number of instances of the network management application, it may be advantageous for a member of the pool of consumers to connect to more than a single member 51 of the pool 50 of instances of the network management application. In this case, the multiple connections are configured such that all network management event data from a particular network element is forwarded to a single member 51 of the pool 50 of instances of the network management application. FIG. 19 shows an example of a mapping where Consumer 1 connects to application instances A-1 and A-2. Connections are formed such that all network management event data from NE1 and NE2 is forwarded to application instance A-1, and all network management event data from NE3 and NE4 is forwarded to application instance A-2. In this way, an application instance consistently receives all network management event data from a particular network element. Any of the allocation methods described above (round robin, load aware) can be modified to follow the type of arrangement shown in FIG. 19.

Figure 20:
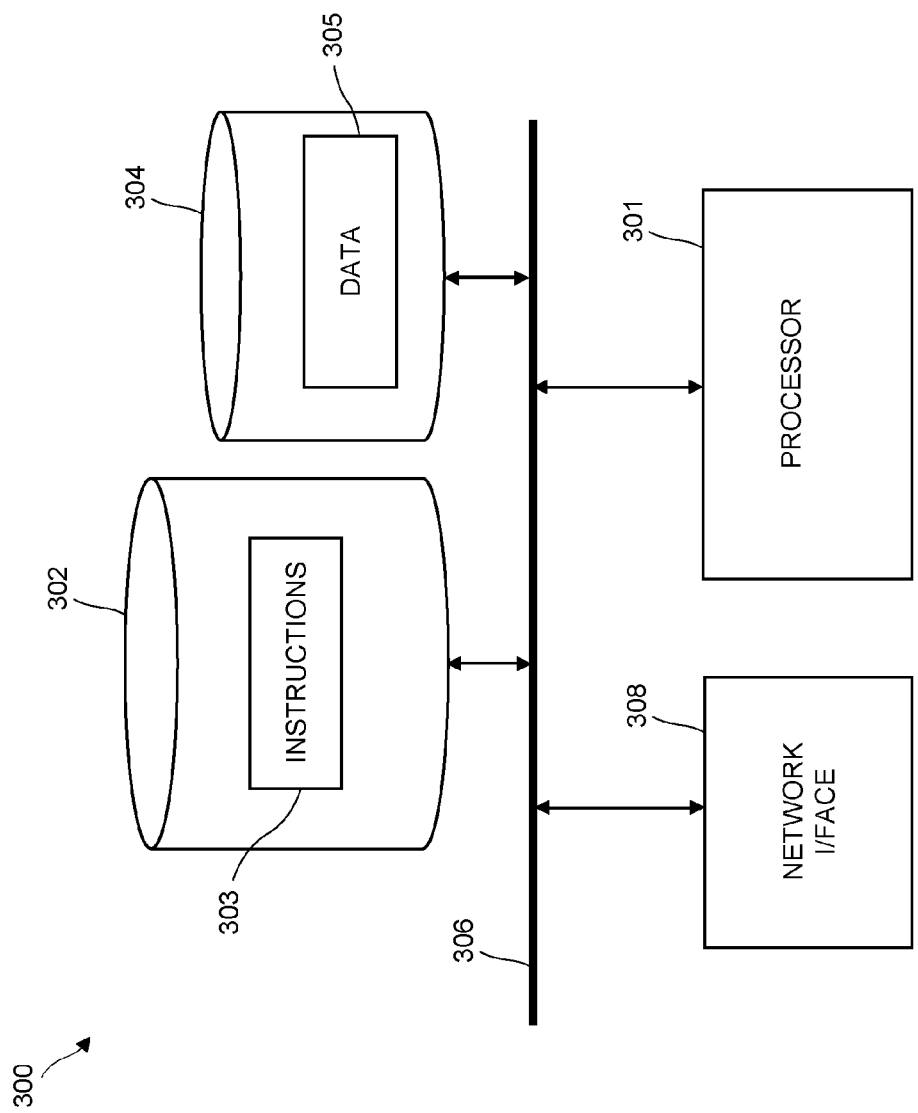
FIG. 20 shows apparatus for a computer-based implementation.

FIG. 20 shows an exemplary processing apparatus 300 which may be implemented as any form of a computing and/or electronic device, and in which embodiments of the system and methods described above may be implemented. Processing apparatus 301 can be provided at the controller (ECPC) 11, or at apparatus which hosts one of the consumers or application instances. Processing apparatus may implement the method shown in any of FIGS. 10 and 13-16. Processing apparatus 300 comprises one or more processors 301 which may be microprocessors, controllers or any other suitable type of processors for executing instructions to control the operation of the device. The processor 301 is connected to other components of the device via one or more buses 306. Processor-executable instructions 303 may be provided using any computer-readable media, such as memory 302. The processor-executable instructions 303 can comprise instructions for implementing the functionality of the described methods. The memory 302 is of any suitable type such as read-only memory (ROM), random access memory (RAM), a storage device of any type such as a magnetic or optical storage device. Additional memory 304 can be provided to store data 305 used by the processor 301. The processing apparatus 300 comprises one or more network interfaces 308 for interfacing with other network entities.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operating a network management system of a communication network, the method comprising:
   determining members of a pool of consumers in the network management system, wherein the members of the pool of consumers are arranged to receive network management event data from network elements of the communication network, wherein the network management event data includes one or more events, wherein the one or more events comprise one or more of: alarms, performance counters, session events, and call detail records, and wherein the pool of consumers includes a group of consumers that consume same type of the one or more events;
   determining members of a pool of instances of a network management application in the network management system, wherein the members of the pool of instances of the network management application are arranged to process the network management event data, wherein determining the members of the pool of instances of the network management application comprises determining event types that the members of the pool of instances of the network management application want to receive from the members of the pool of consumers; and
   determining a mapping between the members of the pool of consumers and the members of the pool of instances of the network management application, wherein the mapping defines connections for forwarding the network management event data, and wherein each of the connections are defined between a member of the pool of consumers and a member of the pool of instances of the network management application.

2. The method of claim 1, wherein the mapping is constrained such that any member of the pool of consumers is connected to a single member of the pool of instances of the network management application.

3. The method of claim 1, wherein the mapping is constrained such that network management event data from a particular network element is forwarded to a single member of the pool of instances of the network management application.

4. The method of claim 1, wherein the mapping permits any member of the pool of instances of the network management application to be connected to more than one member of the pool of consumers in the network management system.

5. The method of claim 1, wherein determining the members of the pool of consumers in the network management system comprises receiving an indication from a consumer that said consumer is a member of the pool of consumers.

6. The method of claim 1, wherein determining the members of the pool of instances of the network management application further comprises receiving an indication from an instance that said instance is a member of the pool of instances of the network management application.

7. The method of claim 1, wherein determining the members of the pool of consumers in the network management system comprises determining event types that the members of the pool of consumers receive from network nodes.

8. The method of claim 1, further comprising:
determining a change in the network management system comprising at least one of:
addition of a new member to the pool of consumers; and
removal of an existing member from the pool of consumers.

9. The method of claim 8, wherein determining the mapping between the members of the pool of consumers and the members of the pool of instances of the network management application is updated or repeated if the change is determined.

10. The method of claim 1, further comprising:
determining a change in the network management system comprising at least one of:
addition of a new member to the pool of instances of the network management application; and
removal of an existing member from the pool of instances of the network management application.

11. The method of claim 1, wherein the mapping is performed on a round robin basis.

12. The method of claim 11, wherein the mapping comprises:
(i) selecting a member from the members of the pool of consumers;
(ii) selecting a member from the members of the pool of instances of the network management application;
(iii) mapping the member selected at step (i) to the member selected at step (ii);
(iv) selecting a next member from the members of the pool of consumers and repeating steps (ii) and (iii); and
(v) repeating step (iv) until all members from the pool of consumers have been selected, and
wherein the members selected at step (ii) are selected on the round robin basis from the members of the pool of instances of the network management application.

13. The method of claim 1, wherein the mapping is based on a load, the load being at least one of:

traffic load of individual connections between the members of the pool of consumers and the members of the pool of instances of the network management application; and
processing load of the members of the pool of instances of the network management application.

14. The method of claim 13, wherein the mapping evenly distributes the load among the members of the pool of instances of the network management application.

15. The method of claim 1, wherein the network management system comprises a plurality of network management applications, and wherein each network management application of the plurality of network management applications comprises a pool of instances of respective network management application.

16. The method of claim 15, wherein the mapping is constrained such that any member of the pool of consumers is connected to a single member in each of the respective pools of instances of the plurality of network management applications.

17. The method of claim 1, wherein the network management system comprises a plurality of pools of consumers, wherein the plurality of pools of consumers are arranged according to a consumer type, and wherein each consumer receives the one or more events from a subset of the network elements.

18. A controller for a network management system, wherein the network management system comprises a pool of consumers and a pool of instances of a network management application, wherein the controller comprises a processor and memory, and wherein the memory contains instructions executable by the processor, whereby the controller is operative to:
determine members of the pool of consumers in the network management system, wherein the members of the pool of consumers are arranged to receive network management event data from network elements of a communication network, wherein the network management event data includes one or more events, wherein the one or more events comprise one or more of: alarms, performance counters, session events, and call detail records, and wherein the pool of consumers includes a group of consumers that consume same type of the one or more events;
determine members of the pool of instances of the network management application in the network management system, wherein the members of the pool of instances of the network management application are arranged to process the network management event data, wherein, to determine the members of the pool of instances of the network management application, the controller is operative to determine event types that the members of the pool of instances of the network management application want to receive from the members of the pool of consumers; and
determine a mapping between the members of the pool of consumers and the members of the pool of instances of the network management application, wherein the mapping defines connections for forwarding the network management event data, and wherein each of the connections are defined between a member of the pool of consumers and a member of the pool of instances of the network management application.

* * * * *